United States Patent [19]
Wood et al.

[11] Patent Number: 5,488,560
[45] Date of Patent: Jan. 30, 1996

[54] APPARATUS FOR AND METHOD OF CONTROLLING A PROCESS

[75] Inventors: John R. Wood, Brighton, United Kingdom; Constantin Marin, Craiova, Romania

[73] Assignee: West Instruments Limited, United Kingdom

[21] Appl. No.: 108,622

[22] Filed: Aug. 27, 1993

[30] Foreign Application Priority Data

Jun. 30, 1993 [GB] United Kingdom ............. 9313534

[51] Int. Cl.$^6$ ............................................. G05B 13/02
[52] U.S. Cl. ............................... 364/148; 364/162
[58] Field of Search ........................ 364/148–183; 318/610, 561, 609, 621

[56] References Cited

U.S. PATENT DOCUMENTS

| | | | |
|---|---|---|---|
| Re. 33,267 | 7/1990 | Kraus | 364/158 |
| 4,195,337 | 3/1980 | Bertrand et al. | 364/177 |
| 4,390,942 | 6/1983 | de Keizer | 364/162 |
| 4,959,767 | 9/1990 | Buchner et al. | 364/177 |
| 5,072,357 | 12/1991 | Niessen et al. | 364/161 |
| 5,157,613 | 10/1992 | Williams et al. | 364/148 |
| 5,249,119 | 9/1993 | Kaseda et al. | 364/161 |

Primary Examiner—Roy N. Envall, Jr.
Assistant Examiner—Steven R. Garland
Attorney, Agent, or Firm—Westman, Champlin & Kelly

[57] ABSTRACT

A process control apparatus for use in a control system includes a controller (40) for coupling to a process in a closed loop of the control system and for controlling a process variable having predetermined set point and measured values. A deviation signal is generated by comparing the set point and measured values to generate a deviation signal and the controller (40) is responsive to the deviation signal to control at least one operating parameter of the process to reduce the deviation signal. An identification section (60) is provided which is responsive to the deviation signal and which provides a measured value of at least one characteristic of the closed loop response of the control system from the deviation signal by integrating the deviation signal with time. A design section (80) is coupled to the output of the identification section (60) and compares the measured characteristic value with at least one predetermined desired characteristic value representing a desired closed loop response of the control system. The controller (40) is adjustable when the difference between the measured and desired characteristic values is greater than a predetermined amount such that the closed loop response of the control system moves towards a desired closed loop response.

55 Claims, 24 Drawing Sheets

APPARATUS FOR AND METHOD OF CONTROLLING A PROCESS

The present invention relates to an apparatus for and method of controlling a process and more particularly to apparatus for and a method of adjusting the response of a controller means coupled in a closed loop with the process to automatically adjust the response of the controller to achieve desired response characteristics.

In known control loops a controller is coupled with a process in a closed loop. The controller adjusts operating parameters of the process and a controlled variable such as temperature or pressure is measured and compared with the desired process variable level which is determined by the user by the setting of a set point value. The measured process variable is then compared with the set point variable and a deviation signal is generated. This deviation signal provides an input to the controller which then controls the operating parameters of the process to reduce the deviation.

The response of the controller should ideally match the dynamics of the process so that the control loop can be maintained at its optimum. This is particularly desirable following a change in the process or a set point level change.

One particular type of controller is a proportional integral derivative (PID) controller. This is a three termed controller having a proportional term, an integral term and a derivative term. One such PID controller is disclosed in U.S. Pat. No. Reissued 33,267. In this arrangement the error signal which is the difference between the measured value and the set point value is monitored. The magnitude of the first maxima and minima in the error signal are measured and the ratio of these values is used to determine the damping coefficient which is a characteristic of the control system. Also, the periodicity of the oscillating waveform is measured and these two values which identify or characterise the control system response to a perturbation in the set point or process are compared with the desired characteristics of the system. If there is a difference between the measured characteristics and the desired characteristics then new PID coefficients are determined using a Ziegler-Nichols technique. These new PID coefficients are then input into the controller in order that the process variables of the process can be controlled such that the level of the measured variable tends to equal the desired set point level and the desired response of the control system is achieved.

The arrangement disclosed in U.S. Pat. No. Reissued 33,267 is however limited in that it is a point based method. The measurements of a first maximum and minimum in the error signal is determined from point error signal values. This technique is therefore sensitive to the level of noise on the error signal.

An object of the present invention is to provide a method of determining the characteristics of a control system which is less sensitive to noise and which can provide a more accurate measurement.

The present invention provides a process control apparatus for use in a control system, wherein said control apparatus comprises controller means for coupling to a process in a closed loop of said control system and for controlling a process variable having predetermined set point and measured values; first comparator means for comparing said predetermined set point and measured values to generate a deviation signal; said controller means being responsive to said deviation signal to control at least one operating parameter of said process to reduce said deviation signal; identification means responsive to said deviation signal to provide a measured value of at least one characteristic of the closed loop response of the control system from said deviation signal by integrating said deviation signal with time; second comparator means coupled to said identification means and operative to compare said at least one measured characteristic value with at least one predetermined desired characteristic value representing a desired closed loop response of the control system; and adjustment means responsive to said second comparison means when the difference between the measured and desired characteristic values is greater than a predetermined amount, to adjust the response of said controller means such that the closed loop response of the control system moves towards said desired closed loop response.

Preferably the identification means is operative to integrate the deviation signal until the deviation signal reaches a predetermined substantially steady state level. Either the identification means can be operative to start integrating the deviation signal at a predetermined level or when the deviation signal level changes from substantially zero to a predetermined level.

Preferably the substantially steady state level is within a noise band about the zero deviation signal level.

In one preferred embodiment the identification means is operative to provide at least one measured characteristic value by calculating a plurality of weighted integrals of the deviation signal, which are more preferably a plurality of time weighted integrals. Such time weighted integrals can be termed a plurality of $j^{th}$ order moments, where a $j^{th}$ order moments is an integral of the deviation signal weighted by minus time to the power j, divided by j factorial, where j is an integer.

In one embodiment of the present invention the identification means is operative to only calculate said plurality of moments if said deviation signal exceeds the level of a predetermined band about the steady state level.

In another embodiment of the present invention the identification means is operative to normalise the moments with respect to the cause of the deviation signal. When the cause of the deviation signal is a change in the set point value the moments can be normalised with respect to the set point value or to a new steady state level. If the cause of the deviation signal is a change in the operation of the process, then the moments can be normalised with respect to the zero order moment.

In one embodiment the identification means is operative to determine parameters of a second order model of the transfer function of the closed loop control system.

In another embodiment of the present invention the identification means is operative to provide measured values of a damping factor and the oscillation period.

Where it is assumed that the control system exhibits a second order behaviour then the identification means is operative to calculate up to the second order moments.

In order to enable the deviation signal to approach a steady state more quickly and in order to selectively enhance portions of the calculated $j^{th}$ order moments, the identification means is preferably operative to provide at least one characteristic by multiplying said deviation signal by a weighting function, and calculate a plurality of $j^{th}$ order weighted moments, where a $j^{th}$ order weighted moment is an integral of the weighted deviation signal weighted by minus time to the power j, divided by j factorial. Ideally such a weighting function is a time weighted function such as $e^{-\alpha t}$, where $\alpha$ is a predetermined damping coefficient and t is time.

When such weighted moments are calculated it can be shown that where it is assumed that the control system exhibits second order behaviour, it is not necessary to calculate the second order weighted moment. Instead the identification means can calculate the zero order unweighted moment and the zero and first order weighted moments in order to determine at least one measured characteristic value.

If the damping factor in the control system is too small then a steady state may never be achieved or at best will be achieved after a considerable length of time. It is therefore desirable for the present invention to incorporate a quick identification means which determines whether the deviation signal is too oscillatory and if so increases the system damping. Therefore, preferably the identification means includes a quick identification means operative for a deviation signal having positive and negative values with time to determine the ratio of the integrals of the first positive and negative excursions of the deviation signal to provide an estimate of a characteristic value. Preferably the identification means is only operative if the periods of time for which said deviation signal is positive and negative to produce said excursions are substantially equal. The characteristic value provided by the quick identification means is ideally a damping factor.

For control systems having a third higher order behaviour resulting in asymmetric oscillation of the deviation signal about the steady state level, the quick identification means is preferably operative to compensate for said third and higher order behaviour by measuring and utilising times at which the deviation signal crosses the steady state. In one embodiment this is achieved by calculating a damping factor z using the equation $$\frac{1}{z} = \frac{2}{\lambda(\lambda+1)} \cdot \frac{|A_2|}{|A_1|} + \frac{1-\lambda}{1+\lambda}$$

where $\lambda$ is the ratio of the periods of a first and a second excursion in the deviation signal, and $|A_1|$ and $|A_2|$ are the integrals of the first and second excursions respectively.

Preferably the controller means in the present invention comprises a proportional integral derivative controller means.

In one embodiment of the present invention the identification means is operative to calculate the parameters of a second order model of the transfer function of the control system from the integral of said deviation signal, and to further calculate a damping factor and an oscillation period from said parameters.

In order to further reduce the sensitivity of the arrangement to noise, the present invention preferably includes filter means to filter the deviation signal input to z identification means wherein the filter means is adapted to remove noise from the deviation signals.

For an $n^{th}$ order control system in one embodiment of the present invention the identification means is operative to calculate at least n moments to provide measured characteristics of the control system to identify the control system.

The present invention also provides a method of controlling a variable of a process coupled to a controller means in a closed loop control system; comprising the steps of providing a predetermined set point value for a process variable; measuring said process variable to provide a measured value; comparing said predetermined set point and measured values to generate a deviation signal; controlling at least one operating parameter of said process in response to said deviation signal; calculating a measured value of at least one characteristic of the closed loop response of the control system from said deviation signal by integrating said deviation signal with time; comparing said at least one measured characteristic value with at least one predetermined desired characteristic value representing a desired closed loop response of the control system; and, when the difference between said measured and characteristic values is greater than a predetermined amount, adjusting the response of said controller means such that the close loop response of the control system moves towards said desired closed loop response.

By the integration method of the present invention information is obtained from all the values of the deviation signal. Such an integration method also reduces the sensitivity of the calculation of the characteristic value to noise.

BRIEF DESCRIPTION OF DRAWINGS

Examples of the present invention will now be described with reference to the accompanying drawings, in which.

THEORY BEHIND THE PRESENT INVENTION

Figure 1:
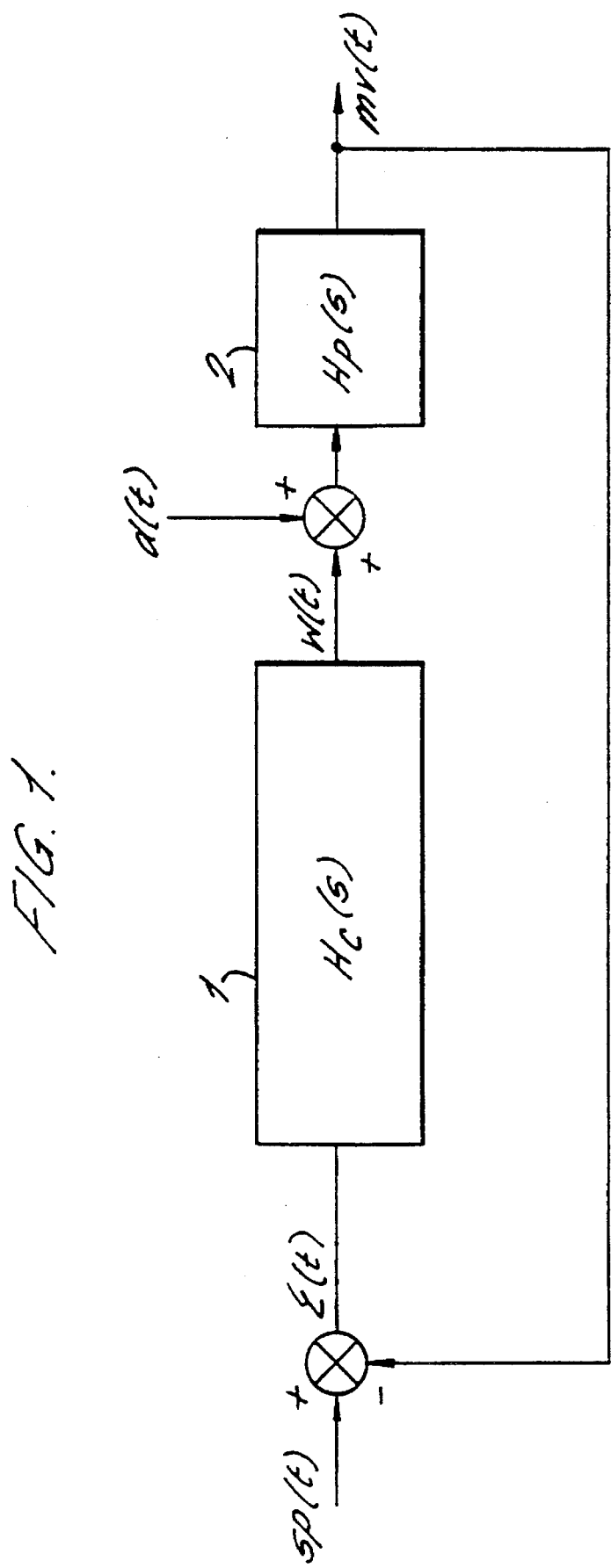
FIG. 1 is a schematic drawing of a closed loop control system.

FIG. 1 schematically illustrates a PID control system. A PID controller 1 having a transfer function $H_c(s)$ manipulates variables W(t) which operate on a process 2 having a transfer function $H_p(s)$. The process 2 is disturbed by a process disturbance d(t) which affects the output measured variable mv(t). The measured variable mv(t) is then compared with the predetermined set point sp(t) which defines the required measured variable level and a deviation signal ε(t) is generated and input into the PID controller 1. The transfer function of the control system is dependent on the transfer function of the controller and the process. In general for a linear system with the transfer function H(s) the output y(t) in response to a step variation of an input $$u(t)=\Delta u \times 1(t)=u(\infty)\times 1(t), \ U(s)=\Delta u/s.$$

$$Y(s)=H(s)\times \Delta u/s$$

where $$H(s) = \frac{b_0 + b_1 s + \ldots + b_m s^m}{a_0 + a_1 s + \ldots + a_n s^n}$$

In general both the numbers n and m are unknown as well as the corresponding parameters $a_k$ and $b_k$.

Two particular types of transfer function will now be considered 1) transfer function without poles and zeros in the origin of the s-plane (which is the applicable transfer function for the closed loop when there has been a step change in the set point)

$$H(o)=K\neq 0 \Rightarrow a_o\neq 0, \ b_o\neq 0$$

so $$H(s) = K \frac{1 + b_1's + \ldots + b_m's^m}{1 + a_1's + \ldots + a_n's^n}$$

$$= H^a(s)$$

$$a_i' = \frac{a_i}{a_o}, \ b_i' = \frac{b_i}{b_o}, \ i \geq 1$$

$$K = \frac{b_o}{a_o} = \frac{y(\infty)}{\Delta u}$$

2) transfer function with a simple zero (s=0) and no poles in the origin of the s-plane (which is the applicable transfer function for the closed loop when there has been a step change in the process mode)

$$H(o)=0 \Rightarrow a_o \neq 0, \ b_o \neq 0$$

so that $$H(s) = K \frac{s(1 + b_2's + \ldots + b_m's^{m-1})}{1 + a_1's + \ldots + a_n's^n}$$

$$= H^b(s)$$

$$a_i' = \frac{a_i}{a_o}, \ b_i' = \frac{b_i}{b_o}, \ i \geq 1, \ K = \frac{b_1}{a_o}$$

The step response of this transfer function has $y(\infty)=0$.

In the above equations s denotes the Laplace operator.

Method of Moments

The Laplace transform of function y(t) is defined as $$\mathcal{L}\{y(t)\} = \int_0^\infty y(t) e^{-st} dt$$

Using Taylor's series expansion for $e^{-st}$, this becomes:

$$\mathcal{L}\{y(t)\} = \int_0^\infty y(t) \sum_{j=0}^\infty \frac{(-t)^j}{j!} s^j dt$$

$$= \int_0^\infty y(t) \sum_{j=0}^\infty \frac{(-t)^j}{j!} s^j dt$$

$$= \sum_{j=0}^\infty m_j s^j$$

where by definition $$m_j = \int_0^\infty y(t) \frac{(-t)^j}{j!} dt$$

$m_j$ is known as the $j^{th}$ order moment and $m_0, m_1, m_2$ etc. can be calculated using integration methods from $$m_0 = \int_0^\infty y(t) dt$$

$$m_1 = -\int_0^\infty t y(t) dt$$

$$m_2 = \int_0^\infty \frac{t^2 y(t)}{2} dt$$

Thus the Laplace transform of a function can be found by numerical integration methods and the moments $m_j$ can be numerically computed if y(t) can be measured.

The $j^{th}$ order moment is a time weighted area with a function deviation with respect to steady state value. The weighting function is given by $(-t)^j/j!$.

The Series Form of the Transfer Function

The relationships between the transfer function parameters and the moments (which can be obtained experimentally) are deduced using a series form of the transfer function through so-called $c_k$ coefficients.

For the two transfer functions mentioned above the series forms are given by $$H^a(s) = \frac{1}{\sum_{K=0}^{\infty} c_K s^K},$$

$$H^b(s) = \frac{s}{\sum_{K=0}^{\infty} c_K s^K}$$

Using the $c_K$ coefficients as intermediaries two types of relationships are established
 a) relationships between transfer function parameters and $c_K$ coefficients,
 b) relationships between moments and $c_K$ coefficients.

Thus the $c_K$ coefficients are in an intermediary position between moments and transfer function parameters. Using so-called closed relations, the structure of the transfer function (m and n paramenters) can be evaluated.

Because the value of the input step $\Delta u$ is unknown normalised moments are used $$m_j' = \frac{m_j}{y(\infty)} \text{ and } m_j' = \frac{m_j}{m_o} \quad j \geq 0$$

for the first and second transfer functions mentioned above respectively.

Theory behind the Preferred Embodiment of the Present Invention

In the preferred embodiment of the present embodiment to be described hereinafter the coefficients of the second type of transfer function are determined. In this case it is assumed that there are no step changes in set point whereas for the first type of transfer function there is a step change in set point.

Referring to FIG. 1, the transient determined by the disturbance is $$E(s) = H(s) D(s)$$

where $$E(s) = \Rightarrow \{\epsilon(t)\}$$

$$D(s) = \Rightarrow \{d(t)\}$$

and H(s) is the closed loop transfer function where it is supposed $$H(s) = \frac{Ks}{a_2 s^2 + a_1 s + a_o}$$

$$D(s) = \frac{\Delta d}{s} \quad \text{(a step change disturbance of unknown amplitude } \Delta d\text{)}$$

$$E(s) = \frac{b_o}{a_2 s^2 + a_1 s + 1} \quad b_o = K\Delta d$$

This is a second order best approximation of a more complex real system, to identify which $a_2$, $a_1$ and $b_0$ have to be determined.

However, $b_o$ contains details or the unknown step change and needs to be eliminated.

From the method of moments $$E(s) = m_0 + m_1 s + m_2 s^2 + \ldots \qquad (1)$$

From the transfer function given above, and from the $c_K$ coefficients $$E(s) = \frac{b_0}{a_2 s^2 + a_1 s + 1} = \frac{1}{c_0 + c_1 s + c_2 s^2} + \ldots$$

Thus $$m_0 + m_1 s + m_2 s^2 + \ldots = \frac{1}{c_0 + c_1 s + c_2 s^2} + \ldots$$

by equating coefficients $$c_0 = \frac{1}{m_0}$$

$$c_1 = -\frac{m_1}{m_0^2}$$

$$c_2 = \frac{1}{m_0} \left[ \frac{m_1^2}{m_0^2} - \frac{m_2}{m_0} \right]$$

and $$b_0 c_0 = 1$$
$$b_0 c_1 = a_1$$
$$b_0 c_2 = a_2$$
$$b_0 c_3 = 0$$

implies $$b_0 = m_0$$

$$a_1 = -\frac{m_1}{m_0} = -m_1'$$

$$a_2 = \left(\frac{m_1}{m_0}\right)^2 - \left(\frac{m_2}{m_0}\right) = (m_1')^2 - m_2'$$

where $$m_1' = \frac{m_1}{m_0} \text{ and } m_2' = \frac{m_2}{m_0} \quad \text{(normalized moments)}$$

Thus by calculating $m_0$, $m_1$, and $m_2$ it is possible to obtain values for $a_1$, $a_2$ and $b_o$ thus identifying the response of the control system to a step load change.

In this calculation two main hypotheses are supposed
 a) the system is initially in one steady state,
 b) the system responds to the load change and integration takes place until a new steady state is achieved.

Normalisation with respect to $m_0$ takes place because it contains the unknown $\Delta d$ which we wish to eliminate.

Because the algorithm has to be performed digitally using a number k of discrete sampled deviation values $\epsilon_k$ having a sample period $\tau$, the equations become:

$$m_0 = \sum_{k=0}^{\infty} \tau \epsilon_k$$

$$m_1 = -\sum_{k=0}^{\infty} (k\tau) \cdot \tau \epsilon_k$$

$$m_2 = \frac{1}{2} \sum_{k=0}^{\infty} k^2 \tau^2 \cdot \tau \epsilon_k$$

and when normalized $$m_1' = -\frac{\tau \sum_{k=0}^{\infty} \epsilon_k(k\tau)}{\tau \sum_{k=0}^{\infty} \epsilon_k} = -\frac{M1}{M0}$$

$$m_1' = \frac{\frac{1}{2} \tau \sum_{k=0}^{\infty} \tau^2 k^2 \epsilon_k}{\tau \sum_{k=0}^{\infty} \epsilon_k} = \frac{1}{2} \frac{M_2}{M_0}$$

Thus the values $M_0$, $M_1$ and $M_2$ are computed for the second order system in order to obtain values for the coefficients $a_1$, $a_2$ and $b_o$.

Weighted Moments

When a load change occurs and a deviation signal is generated, using the method of moments technique it is necessary to integrate until the deviation signal returns substantially to a new steady state which in the embodiment of the present invention will be described hereinafter is substantially zero. However, when the deviation signal is slowly varying it can take some time for the signal to approach the steady state. This can extend the time required to obtain the integral of the deviation signal. To avoid this it is possible to mathematically weight the deviation signal in such a manner that the trailing end of the signal is given a smaller weighting so that the fact that it is not at a steady state does not cause errors in the moment calculation. This greatly reduces the time required for the integration since it is not necessary to wait for a steady state to be reached before moment calculation can take place. The weighted deviation signal approaches the steady state more rapidly. This can be particularly advantageous in order to avoid the possibility of a new load change during the integration performed during the identification algorithm, The deviation signal can thus be multiplied by a weighting function $e^{-\alpha t}$ and thus the weighted moments are given by $$m_j(\infty) = \int_0^\infty \epsilon(t) e^{-\alpha t} \frac{(-t)^j}{j!} dt$$

where $\alpha$ is a damping coefficient for the weighting function.

Figure 2A:
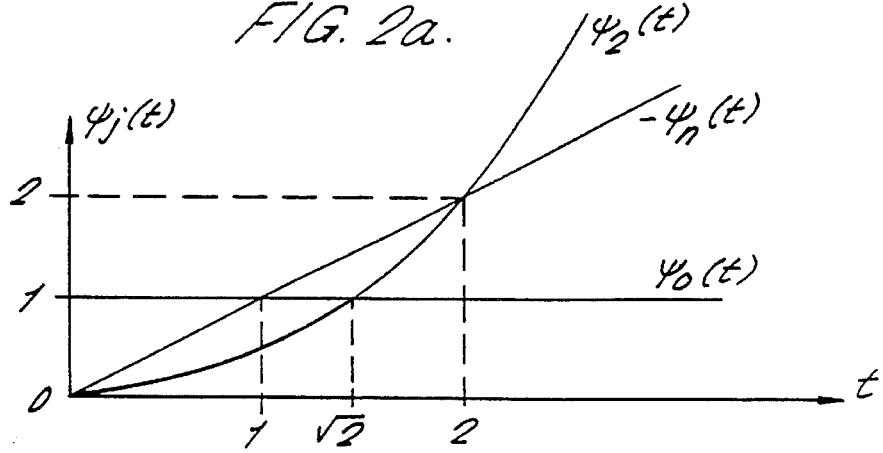
FIG. 2a is a graphical representation of the zero first and second order moment weighting functions.
Figure 2B:
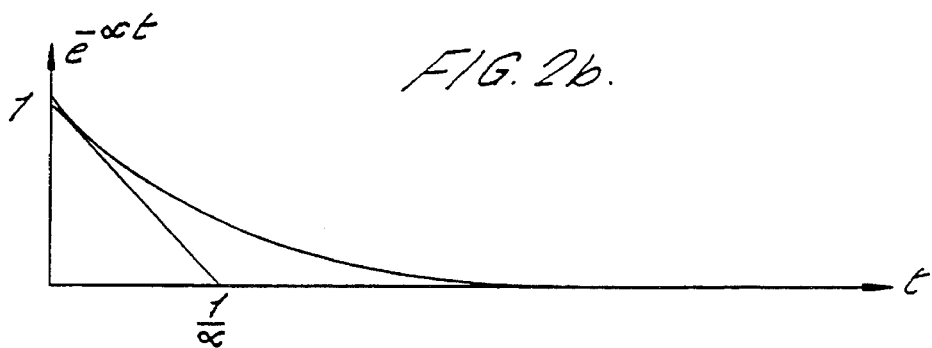
FIG. 2b is a graphical representation of the weighting function applied to the moments.

For the unweighted moments the weighting of the integral is given by $$\Psi_j(t) = \frac{(-t)^j}{j!}$$

which is graphically represented for $j=0$ to 2 in FIG. 2a;

FIG. 2b graphically illustrates the weighting function $e^{-\alpha t}$.

Figure 2C:
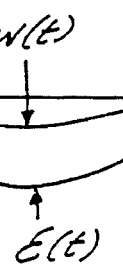
FIG. 2c illustrates the effect of the weighting function on the deviation signal.

FIG. 2c illustrates the effect of the weighting coefficient on the deviation signal $\epsilon(t)$ to produce the weighted deviation signal $w(t)$ which approaches the steady state of zero deviation level much more rapidly.

Figure 2D:
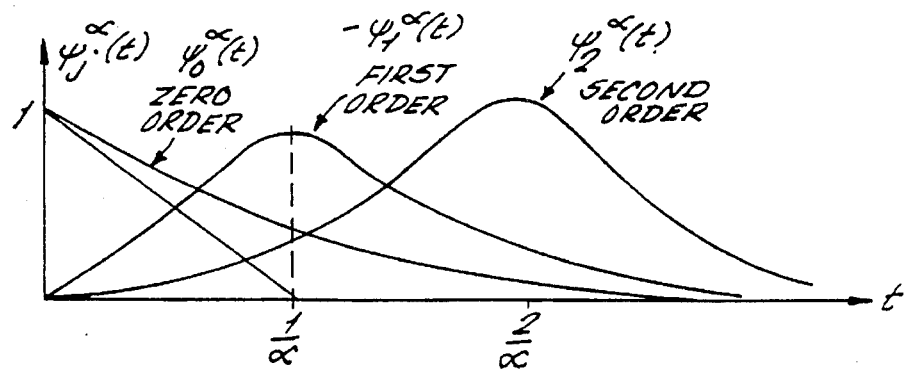
FIG. 2d illustrates the effect of the weighting function on the zero first and second order moment weighting functions.

The effect of the weighting function is to enhance a time period of interest. FIG. 2d illustrates the total weighting coefficient on the integral of the deviation signal. This graph results from the combination of FIGS. 2a and 2b where $$\Psi_j^\infty(t) = e^{-\alpha t} \frac{(-t)^j}{j!}$$

From the above the value for $\alpha$ determines the time portions of the deviation signal given the highest weighting.

It can be shown that whilst the disturbance $E(s)$ can be given by $$E(s) = \frac{b_0}{a_2 s^2 + a_1 s + a_0}$$

The weighted disturbance can be given by $$W(s) = \frac{\hat{b}_0}{\hat{a}_2 s^2 + \hat{a}_1 s + \hat{a}_0}$$

The coefficients $a_2$, $a_1$, $a_0$, $b_0$ can be equated with $\hat{a}_2$, $\hat{a}_1$, $\hat{a}_0$ and $\hat{b}_0$ using the Laplace shift theorem for the relationship between $E(s)$ and $W(s)$, to give:

$$b_o = \hat{b}_0$$

$$a_2 = \hat{a}_2$$

$$a_1 = \hat{a}_1 - 2\alpha \hat{a}_2$$

$$a_0 = \hat{a}_0 - \alpha \hat{a}_1 + \alpha^2 \hat{a}_2$$

The coefficients $a_2$, $a_1$, $a_0$ and $b_0$ can be formed from $m_0$, $m_1$ and $m_2$ as hereinbefore defined. $m_0$ is a simple unweighted integral which is obtained by measurement. The weighted moments $m_0(\alpha)$, $m_1(\alpha)$ and $m_2(\alpha)$ can then be obtained and used to calculate the weighted coefficients $\hat{a}_2$, $\hat{a}_1$, $\hat{a}_0$ and $\hat{b}_0$.

However, from the relationships between the coefficients:

$$\hat{b}_0 = m_o(\infty) \hat{a}_0$$

$$\hat{a}_0 = \frac{\hat{b}_0}{m_o(\infty)}$$

$$\hat{a}_1 = -\frac{m_1(\infty)}{m_0(\infty)}$$

Using $$E(s) = \int_0^\infty \epsilon(t) e^{-st} dt$$

and when $s = 0$ $$E(0) = \int_0^\infty \epsilon(t) dt = m_0(0)$$

but $E(s) = \frac{b_0}{a_2 s^2 + a_1 s + a_0}$

Therefore $$E(0) = \frac{b_0}{a_0} = m_0(0)$$

and $b_0 = a_0 m_0(0)$ but $\hat{a}_0 = \frac{\hat{b}_0}{m_0(\infty)}$ and $b_0 = \hat{b}_0$ Therefore $$\hat{a}_0 = \frac{a_0 m_0(0)}{m_o(\infty)}$$

but $a_0 = 1$ and therefore $$\hat{a}_0 = \frac{m_0(0)}{m_0(\infty)}$$

From the above $a_1$ and $a_0$ can be calculated using $m_o$, $m_o(\alpha)$ and $m_1(\alpha)$ From the relationships between the coefficients $$1 = \hat{a}_0 - \alpha \hat{a}_1 + \alpha^2 \hat{a}_2$$

substituting for $a_0$ and $a_1$ gives $$\alpha^2 \hat{a}_2 = 1 - \frac{m_0(0)}{m_0(\infty)} + \infty \frac{m_1(\infty)}{m_0(\infty)}$$

Hence we can calculate $a_2$ using only $m_0(0)$, $m_O(\alpha)$ and $m_1(\alpha)$. This can be used to find $a_1$ and $a_2$ from $$a_1 = \hat{a}_1 - 2\alpha \hat{a}_2$$

and $$a_2 = \hat{a}_2$$

Thus the unweighted zero order moment can be used to provide additional information thus obviating the need to calculate the second order weighted moment.

It is thus possible to calculate the characteristics of the system using the zero order unweighted order moment and the zero and first order weighted moments.

Also, the use of the weighting function $e^{-\alpha t}$ also has the advantage that the trailing end of the deviation signal is given a smaller weighting allowing moment calculation before a steady state is reached, thus reducing the sampling time required for the transient. This is particularly advantageous for systems where it is likely that there is going to be frequent load or set point changes. It is essential that while the transient is measured following a load change, there is no load or set point changes. If these occur then the method of moments base algorithm must restart thus increasing the time taken for system identification.

As has been shown above, the weighting of the moments does not effect (other than in a trivial algebraic way) the relationship to the Laplace second order model.

Non-Steady State Initial Conditions

It can be shown that by normalising the weighted moments it is not necessary to start integrating from a steady state condition. It is possible to initiate the calculation of the moments by integrating from the point at which the deviation signal is zero. Consider the closed loop behaviour $$E(s) = \frac{Ks}{a_2 s^2 + a_1 s + 1} \cdot D(s)$$

where $$D(s) = \frac{\Delta d}{s}$$

This is given by the differential equation $$a_2 \frac{\partial^2 \epsilon(t)}{\partial t^2} + a_1 \frac{\partial \epsilon(t)}{\partial t} + \epsilon(t) = K \cdot \frac{\partial d(t)}{\partial t}$$

if $u(t)$ is a step $$\frac{\partial d(t)}{\partial t} = \Delta d\, \delta(t) \text{ where } \delta(t) \text{ is a delta function}$$

applying Laplace transforms to non-zero initial conditions.

$$a_2 \left[ s^2 E(s) - s\epsilon(0) - \frac{\partial \epsilon(0)}{\partial t} \right] +$$

$$a_1 [sE(s) - \epsilon(o)] + E(s) = K \Delta d$$

where $\mathcal{L}\{\delta t\} = 1$ $$[a_2 s^2 + a_1 s + 1]E(s) = (a_2 \epsilon(o))s + \left( a_2 \frac{\partial \epsilon(o)}{\partial t} + a_1 \epsilon(0) + K\Delta d \right)$$

for $t \geq 0$ for $t > 0 \frac{\partial d(t)}{\partial t} \equiv 0$ $(t = 0^+)$ $$\Rightarrow a_2 \frac{\partial^2 \epsilon(t)}{\partial t^2} + a_1 \frac{\partial \epsilon(t)}{\partial t} + \epsilon(t) = 0$$

$$\Rightarrow (a_2 s^2 + a_1 s + 1)E(s) = a_2 \epsilon(0^+)s + a_2 \frac{\partial \epsilon(o^+)}{\partial t} + a_1 \epsilon(o^+)$$

but $\epsilon(o^+) = \epsilon(o)$

Thus $\frac{\partial \epsilon(0^+)}{\partial t} = \left( \frac{\partial \epsilon(o)}{\partial t} + \frac{K\Delta d}{2} \right)$ $\Delta d$ can be interrupted as a sudden change in power for $s = o$, $E(o) = {}_o m(o)$ \hfill (Equation A)

$$\Rightarrow m_o(o) = a_2 \frac{\partial \epsilon(o)}{\partial t} + a_1 \epsilon(o) + K\Delta d$$

$(a_2 s^2 + a_1 s + 1)E(s) = a_2 \epsilon(0)s + m_o(0)$
for $\epsilon(o) = 0$
$(a_2 s^2 + a_1 s + 1)E(s) = m_o(o)$ \hfill 1 for $s = \alpha$, $E(\alpha) = \int_0^\infty \epsilon(t)e^{-\alpha t}dt = m_o(\alpha)$ $(a_2 \alpha^2 + a_1 \alpha + 1)m_o(\alpha) = m_o(0)$ $$a_2 \alpha^2 + a_1 \alpha + 1 = \frac{m_o(0)}{m_o(\alpha)}$$

$$a_2 \alpha + a_1 = \left( \frac{m_o(0)}{m_o(\alpha)} - 1 \right) \cdot \left( \frac{1}{\alpha} \right)$$

The derivative of Equation 1 gives:

$$2a_2 \alpha + a_1 = -\frac{m_o(0)}{m_o^2(\alpha)} m_1(\alpha)$$

let $q_1 = \left( \frac{m_o(0)}{m_o(\alpha)} - 1 \right) \frac{1}{\alpha} = (m_o'(\alpha) - 1) \cdot \frac{1}{\alpha}$ let $h_1 = -\frac{m_o(0)}{m_o(\alpha)} \cdot \frac{m_1(\alpha)}{m_o(\alpha)} = -m_o'(\alpha)m_1'(\alpha)$ where $$m_o(0) = \int_0^\infty \epsilon(t)dt$$

$$m_o(\alpha) = \int_0^\infty \epsilon(t)e^{-\alpha t}dt$$

$$m_1(\alpha) = -\int_0^\infty \epsilon(t)te^{-\alpha t}dt$$

The normalised moments are $$m_o'(\alpha) = \frac{m_o(0)}{m_o(\alpha)}$$

$$m_1'(\alpha) = \frac{m_1(\alpha)}{m_o(\alpha)}$$

The control system transfer function coefficients can then be found from $$a_2 = \frac{h_1 - q_1}{\alpha}$$

$$a_1 = 2q_1 - h_1$$

The relative damping coefficient ($\xi$) and the oscillation period ($t_{osc}$) can then be found from $$a_2 = T^2 = \frac{1}{\omega_0^2}$$

$$a_1 = 2\xi T$$

$$t_{osc} = \frac{2\pi}{(1-\xi^2)^{1/2}} \cdot T$$

$$\xi = \frac{a_1}{2\sqrt{a_2}}$$

The relative damping factor $\xi$ is related to the damping factor zeta Z by $$Z = exp(\pi \times \xi/(1-\xi^2)^{1/2})$$

if $0<\xi<1$ the transient is a damped oscillation
if $\xi \geq 1$ the transient is damped and not oscillating As can be seen from the above, the coefficients of the transfer function can be identified from measurement of the transient even when measurement does not start at initial steady state conditions. This is possible since as can be seen from Equation A above the zero order moment contains information on the initial conditions. The moments are normalised with respect to the weighted zero order moment and thus the initial conditions are no longer variables in the equations and are compensated for.

Evaluation of an Estimate of the Damping Factor (Quick Result)

Figure 3A:
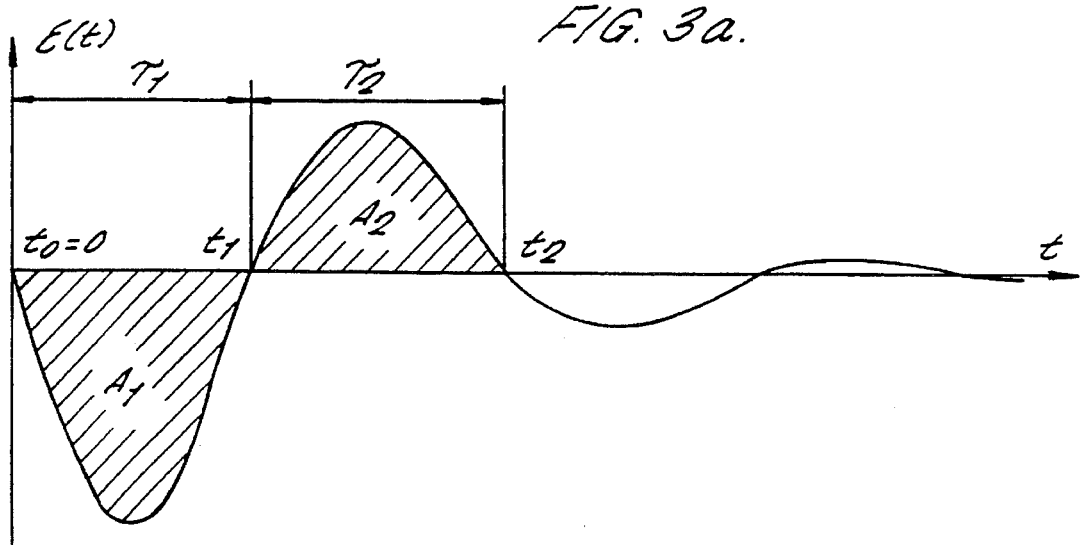
FIG. 3a illustrates how a damping coefficient is estimated by comparing the ratio of areas of the first and second excursions in the deviation signal.

FIG. 3a shows the deviation signal which has a first negative excursion of area $A_1$ and a first positive excursion of area $A_2$. It can be shown that the damping factor z for the deviation signal can be given by $$\frac{1}{Z} = -\frac{A_2}{A_1}$$

The ratio of areas of the first positive and negative excursion can therefore be used to obtain a quick estimate of zeta to determine whether the control system is too oscillatory for the method of moments based algorithm. If this is so then the PID coefficients are adjusted to increase zeta.

Figure 3B:
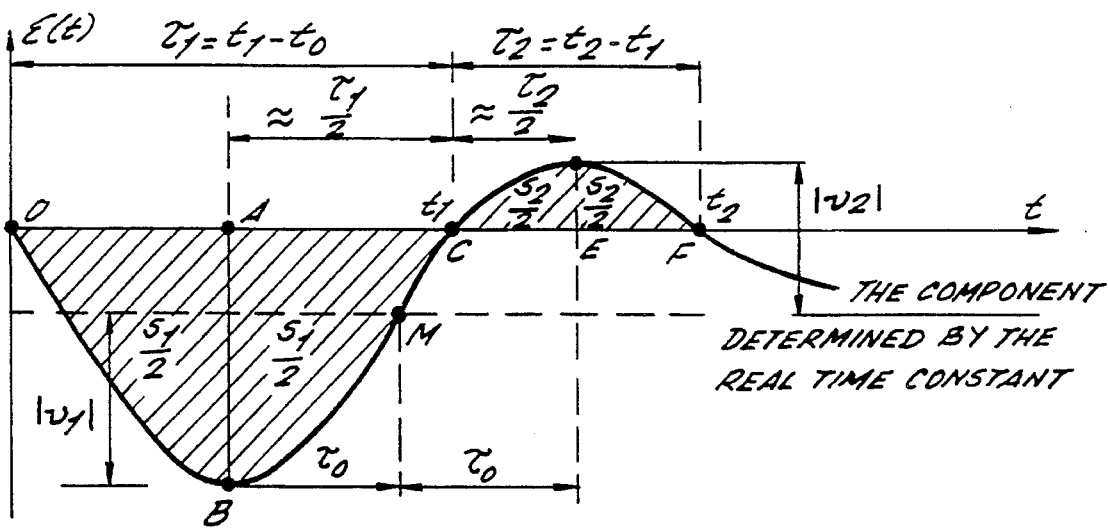
FIG. 3b illustrates the deviation signal for a system exhibiting higher than second order behaviour.

However, for higher order systems the deviation signal can have a waveform as shown in FIG. 3b. The transient is offset by a component determined by the real time constant of the system and the ratio of the areas of the first positive and negative excursions is seriously affected. In order to compensate for this constant, the zero level must be moved to make $\tau_1 = \tau_2$.

Figure 3C:
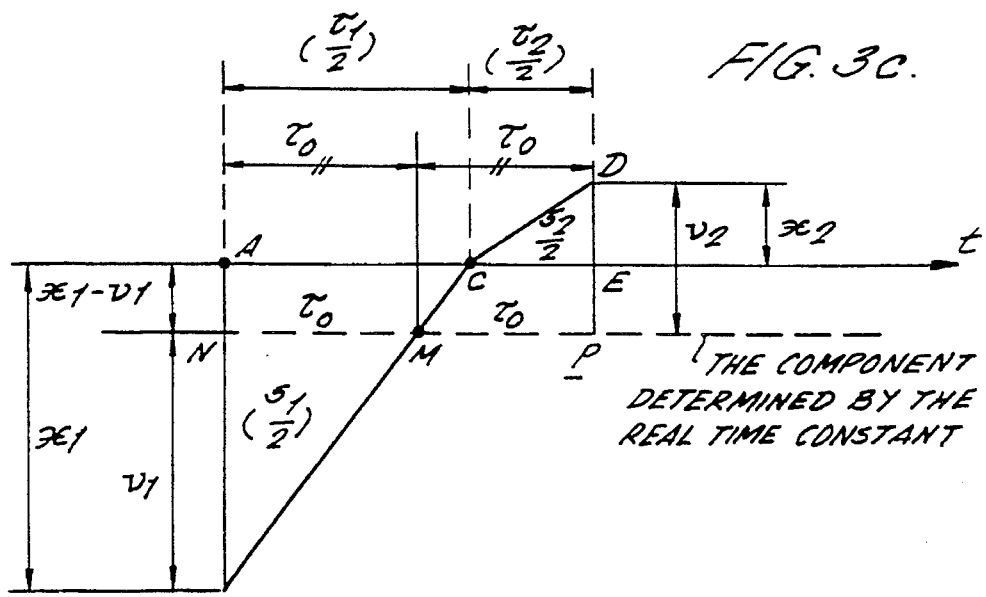
FIG. 3c illustrates how the areas are approximated using triangles.

In order to compensate for the real time constant the areas ABC and CDE will be approximated by triangles as shown in FIG. 3c.

To avoid the asymmetry, we define the virtual peaks $$|v_1| = NB; \; |v_2| = DP, \text{ so that } NM = MP = \tau_o$$

$$2\tau_o = \frac{\tau_1}{2} + \frac{\tau_2}{2} \Rightarrow \tau_o \frac{\tau_1 + \tau_2}{4}$$

$$\Delta ABC: \frac{S_1}{2} = \frac{AB \cdot AC}{2} = \frac{x_1 \cdot \frac{\tau_1}{2}}{2} = \frac{x_1 \tau_1}{4} \Rightarrow S_1 = \frac{x_1 \tau_1}{2}$$

$$\Delta CDE: \frac{S_2}{2} = \frac{DE \cdot CE}{2} = \frac{x_2 \cdot \frac{\tau_2}{2}}{2} = \frac{x_2 \tau_2}{4} \Rightarrow S_2 = \frac{x_2 \tau_2}{2}$$

$$NM = MP = \tau_o = \frac{\tau_1 + \tau_2}{4}$$

$$\Rightarrow x_1 = \frac{2S_1}{\tau_1}; \; x_2 = \frac{2S_2}{\tau_2}$$

$$\Delta BNM \approx \Delta BAC \Rightarrow \frac{x_1}{|v_1|} = \frac{\tau_1/2}{\tau_o} \Rightarrow |v_1| = \frac{2\tau_o}{\tau_1} \cdot x_1$$

$$\Rightarrow |v_1| = \frac{2\tau_o}{\tau_1} \cdot \frac{2S_1}{\tau_1}$$

$$|v_1| = \frac{Y\tau_o}{\tau_1^2} S_1$$

$$x_1 - |v_1| = \frac{2S_1}{\tau_1} - \frac{Y\tau_o}{\tau_1^2} S_1 = \frac{\tau_1 - 2\tau_o}{\tau_1^2} \cdot 2s_1$$

$$|v_2| = x_2 + (x_1 - |v_1|) = \frac{2s_2}{\tau_2} + \frac{\tau_1 - 2\tau_o}{\tau_1^2} \cdot 2s_1$$

$$|v_2| = \frac{1}{\tau_2} \cdot 2s_2 + \frac{\tau_1 - 2\tau_0}{\tau_1^2} \cdot 2s_1$$

$$|v_1| = \frac{2\tau_o}{\tau_1^2} \cdot 2s_1$$

$$\tau_o = \frac{\tau_1 + \tau_2}{4}$$

$$\tau_1 - 2\tau_o = \tau_1 - \frac{\tau_1 + \tau_2}{2} = \frac{\tau_1 - \tau_2}{2} \Rightarrow$$

$$\frac{|v_2|}{|v_1|} = \frac{\frac{1}{\tau_2} \cdot 2s_2 + \frac{\tau_1 - \tau_2}{2\tau_1^2}}{\frac{\tau_1 + \tau_2}{2\tau_1^2} \cdot 2s_1} \cdot 2s_1$$

$$\frac{|v_2|}{|v_1|} = \frac{\tau_1 - \tau_2}{\tau_1 + \tau_2} + \frac{2\tau_1^2}{\tau_2(\tau_1 + t_2)} \cdot \frac{S_2}{S_1}$$

$$\lambda = \frac{\tau_2}{\tau_2} \Rightarrow$$

$$\frac{1}{Z} = \frac{|v_2|}{|v_1|} = \frac{2}{\lambda(\lambda + 1)} \cdot \frac{S_2}{S_1} + \frac{1-\lambda}{1+\lambda} \quad \begin{array}{l} S_2 = |A_2| \\ S_1 = |A_1| \end{array}$$

for second order systems this reduces to:

$$\frac{1}{Z} = \frac{S_2}{S_1} = -\frac{A_2}{A_1}$$

where $\lambda = 1$
and $\tau_1 = \tau_2$

Thus for a system which exhibits second order behaviour, an estimation of the damping factor can be obtained by taking the ratio of the integrals of the deviation signal from $t_0$ to $t_1$ and from $t_1$ to $t_2$.

If however the system exhibits third or higher order behaviour then it is necessary to compensate for this. If the system has an additional big real time constant, then $$\tau_2 \neq \tau_1$$

where $\tau_1$ and $\tau_2$ are the periods of the first and second excursions respectively. The damping factor formula based on the ratio of the areas must therefore be modified to compensate for this, as shown in the equations above.

As it can be seen from the above equation by measuring the times $\tau_1$ and $\tau_2$ and integrating over the first positive and negative excursions it is possible to calculate a value for the damping coefficient even if the system exhibits higher than second order behaviour.

DETAILED DESCRIPTION OF THE PREFERRED EMBODIMENT

Figure 4:
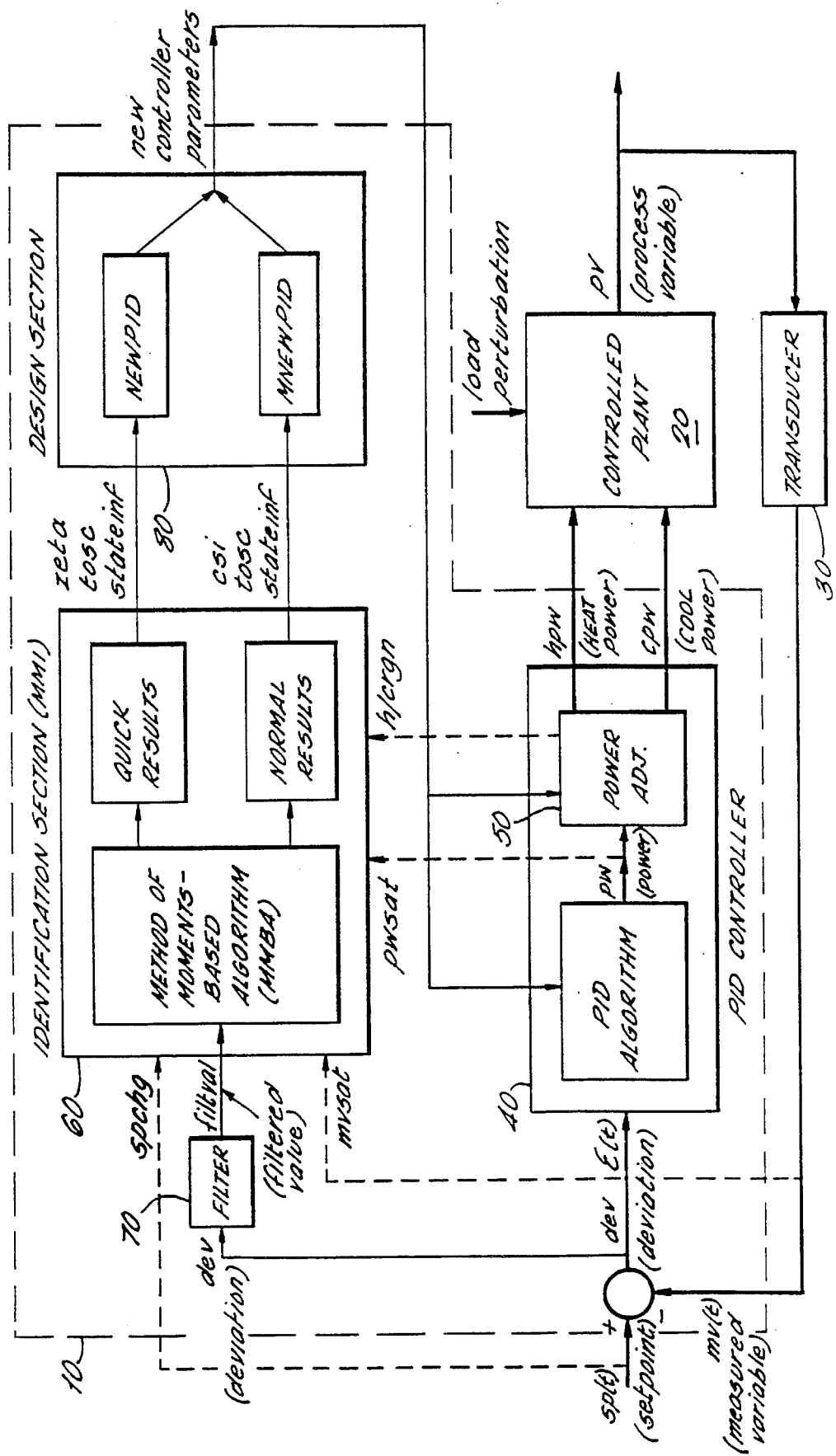
FIG. 4 is a schematic representation of a control system including the process control apparatus according to one embodiment of the present invention.

FIG. 4 schematically illustrates the structure of the process controller apparatus 10 connected in a closed loop with a controlled plant 20 representing the process to be controlled. In this preferred embodiment the process to be controlled is heating and cooling, although it will be understood by a skilled person that any process paramater can be controlled. The arrangement shown in FIG. 4 corresponds to the schematic layout shown in FIG. 1 where reference numerals 1 and 10 represent the same system components as do reference numerals 2 and 20.

A user of the process controller apparatus 10 sets the desired level of a process variable of the plant 20 using the set point value sp(t) which is input to the process controller apparatus 10. The process variable pv of the plant 20 is measured using a transducer 30 to provide a measured variable value mv(t) which is also input into the process controller apparatus 10. The measured process variable value mv(t) is then compared with the set point value sp(t) to generate a deviation signal $\epsilon(t)$ Within the process controller apparatus 10 there is a proportional integral derivative (PID) controller 40. The PID controller 40 operates the PID algorithm, which will be well understood by a skilled person in the art, in order to utilise the deviation signal $\epsilon(t)$ to generate a power signal pw. The power signal is used to control a power adjusting means 50 which either generates a heating power hpw or cooling power cpw to control the temperature of the controlled plant 20. Thus in this arrangement by providing heating and cooling to the controlled plant 20 the temperature of the plant 20 is the controlled process variable and thus the measured process variable mv(t) represents the temperature of the plant 20 whilst the set point sp(t) represents the desired temperature.

The control plant 20 is subject to load perturbations which result in a deviation of the measured temperature mv(t) with respect to the set point sp(t). The PID controller responds to such a change in the deviation $\epsilon(t)$ to try to minimise such deviation. However, the load pertubations can change the dynamics of the plant 20. This requires adjustment of the proportional integral and derivative coefficients of the PID controller. The automatic self-tuning of the PID coefficients of the PID controller is performed according to one embodiment of the present invention by inputting the deviation signal $\epsilon(t)$ into an identification section 60 via a filter 70 which removes noise from the deviation signal.

The filter deviation signal filtval is operated upon within the identification section 60 using a method of moments based algorithm which will be described hereinafter.

The identification section 60 also receives data regarding the closed loop behaviour of the control system. This data includes a) spchg (set point change flag) which indicates when there is a set point change. This is important as will be seen from the description of the method of operation since the method of moments based algorithm will restart if there is a set point change. (The algorithm is designed to respond to load changes and not set point changes).

b) pwsat (power saturated flag) which indicates if the power from the PID algorithm has reached saturation (its maximum).

c) h/crgn (heat cool region information) which provides heat cool information.

d) mvsat (measured variable saturation) which indicates if the measured variable has reached saturation (a maximum value).

In this embodiment of the present invention the method of moments based algorithm performs two types of operation termed "Quick Results" and "Normal Results". Quick Results will calculate a value for the damping coefficient zeta and the oscillation period $t_{osc}$ of the control system. Quick Results returns an estimate of zeta quickly by comparing an integral of the first positive and negative excursion in the deviation signal following a load perturbation effecting the plant 20. As will be described hereinafter, this is used to increase the damping of the control system if it is too oscillatory.

Normal Results provides a value for the relative damping factor csi and the oscillation period $t_{osc}$ if the transient is stable or not too oscillatory.

The process control apparatus 10 includes a design section 80 which utilises the values of zeta csi and $t_{osc}$ to generate new PID coefficients for the PID controller 40. In this embodiment of the present invention the design section 80 operates in two different ways for convenience. NEWPID utilises the value of zeta and $t_{osc}$ provided by Quick Results. MNEWPID utilises the values for csi and $t_{osc}$ provided by Normal Results. The reason that the separate MNEWPID is used is to avoid having to calculate the damping factor zeta from the damping factor csi. MNEWPID is able to use the relative damping factor csi directly in order to generate the new PID coefficients required for the PID controller 40.

The two separate procedures within the design section 80 are used merely for computational efficiency and where there are no tight restraints on processing it may be possible for the Normal Results procedure to include a step to calculate the damping factor zeta from the relative damping factor csi.

The design section 80 operates in a known manner to generate the PID coefficients from zeta, csi and $t_{osc}$. Such a method is a simple iterative convergence method to achieve the target values. Alternatively, such a method can utilise the Zeigler-Nichols procedure such as that described in U.S. Pat. No. Reissued 33,267, the disclosure of which is hereby incorporated by reference.

The present invention is thus concerned with obtaining values for the damping factor and the oscillation period of the control system following a load perturbation on the plant 20. The present invention is therefore concerned with identifying the response of the system to a perturbation.

In one example of the present invention the desired value for zeta is 6 and for csi 0.5. The PID coefficients are adjusted in the design section 80 to achieve these values.

Figure 5:
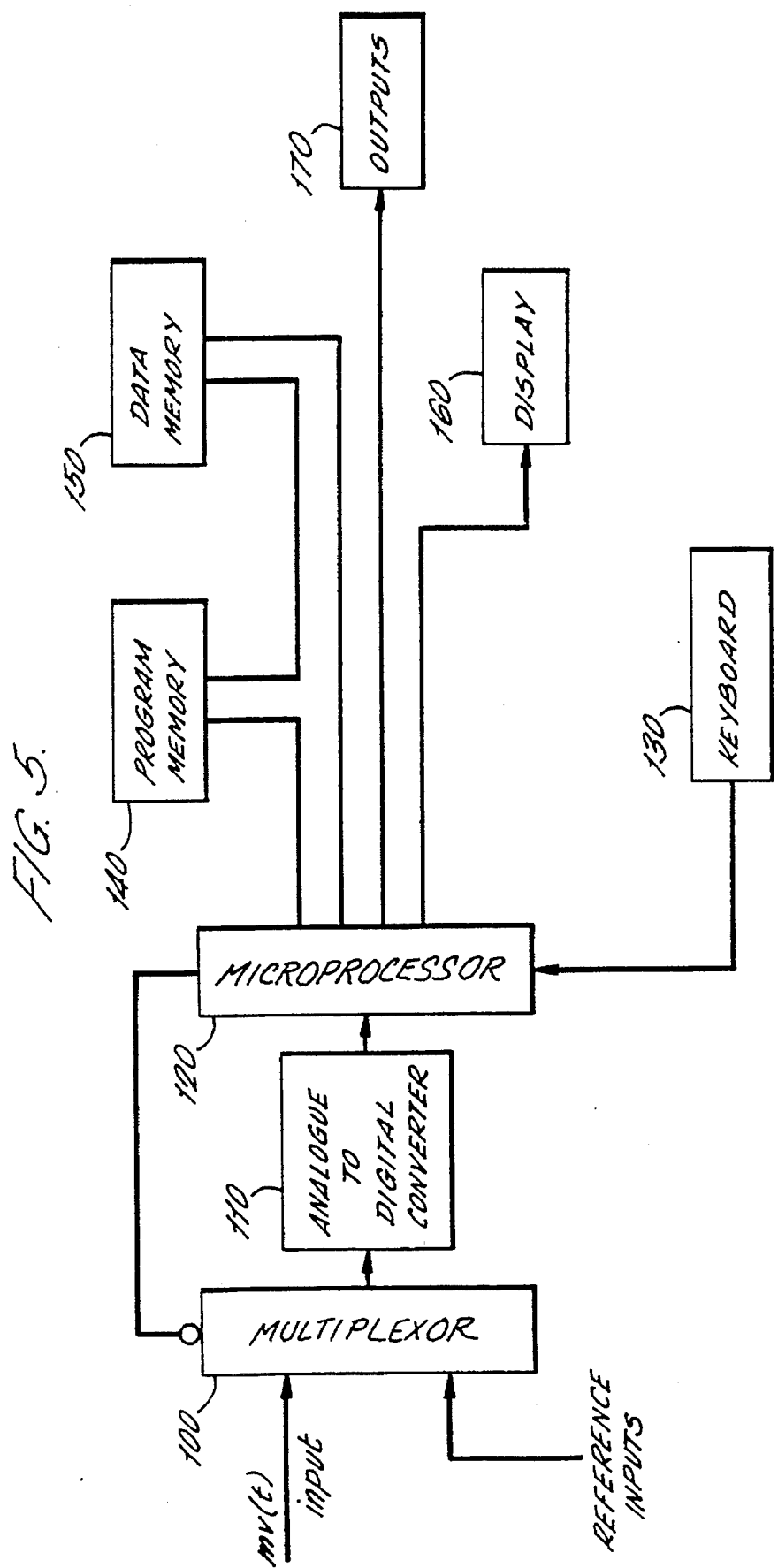
FIG. 5 illustrates schematically the process control apparatus according to one embodiment of the present invention.

FIG. 5 illustrates schematically the process control apparatus 10 of FIG. 4. The measured variable mv(t) is input into a multiplexer 100. The output of the multiplexer is analogue to digital converted by analogue to digital converter 110 before being sent to the processor 120. The processor 120 controls the multiplexer 100 to output one of its inputs as required. The multiplexer 100 can also receive reference inputs in order to avoid having to measure an absolute value for a measured variable.

Connected to the processor 120 is a keyboard 130 for inputting parameters such as a set point sp(t). The microprocessor 120 is also provided with a separate program and data memory 140 and 150 respectively, and a display 160. The values calculated by the microprocessor 120 are then sent to the outputs 170.

The arrangement shown in FIG. 5 is of a conventional processor system which would be well understood by a skilled person in the art. The microprocessor for example can be an 8 bit processor such as the Hitachi 6303 processor.

The operation of the process control apparatus will now be described with reference to the remaining figures.

Figure 6:
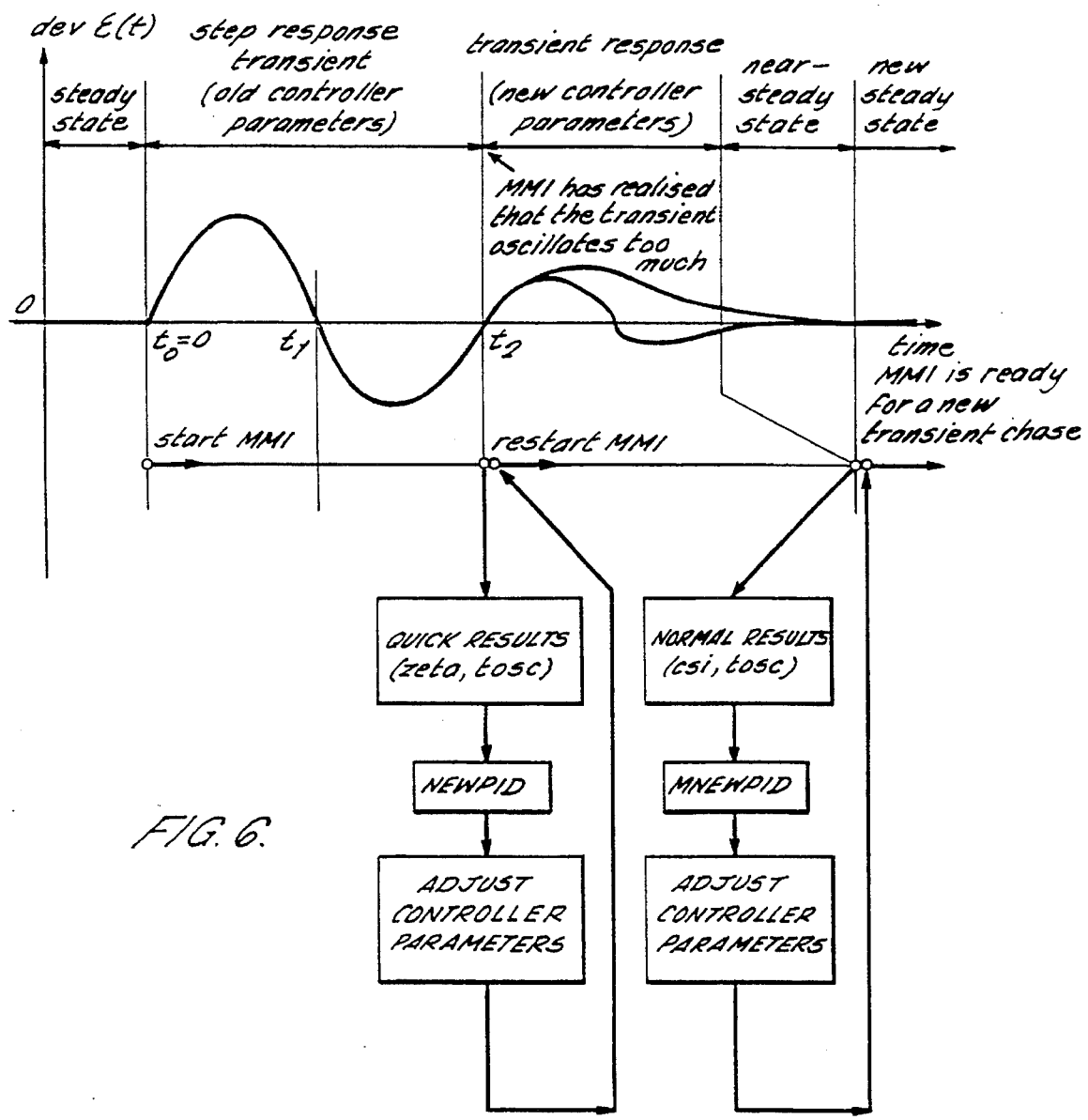
FIG. 6 illustrates schematically the operation of the process control apparatus on the filtered deviation signal (filtval)

FIG. 6 illustrates a theoretical graph of the fluctuations in a filtered deviation signal $\epsilon(t)$ with time for the control system shown in FIG. 4. Initially at t=0 it is assumed that there is no deviation signal, i.e. the measured variable equals the set point. At some point $t_0$, as a result of a load perturbation on the plant 20, the deviation signal $\epsilon(t)$ increases to form a positive excursion and then decreases to form a negative excursion. The points at which the deviation signal cross the zero are given by $t_1$ and $t_2$. At $t_2$ the Quick Results procedure will estimate a value for the damping coefficient zeta and provide a value for the oscillation period $t_{osc}$ if $t_1$ is approximately equal to $t_2-t_1$. The Quick Results procedure calculates the damping coefficient by calculating the ratio of the areas of the first positive and negative excursions. If it is determined that the ratio is too great, this indicates that the system is too oscillatory and the damping coefficient is too small. Thus in the design section 80 if zeta is too large then NEWPID calculates new PID coefficients for the PID controller 40.

At $t_0$ the method of moments based algorithm is started. If however it is determined that at $t_2$ the deviation signal $\epsilon(t)$ is too oscillatory then the PID coefficients are adjusted and the method of moments based algorithm is restarted. What in practice this means is that since the method of moments based algorithm is an integration technique, as is described in the theory hereinbefore explained, the integration of the deviation signal $\epsilon(t)$ is restarted at $t_2$.

In FIG. 6 after $t_2$ there are two different deviation signals $\epsilon(t)$ shown. The upper one returns slowly to the steady state whilst the lower one crosses the zero deviation signal level before reaching the steady state level. Once the deviation signal $\epsilon(t)$ reaches the steady state level, the normal results procedure is able to calculate the relative damping factor csi and the oscillation period $t_{osc}$ from the integration of the deviation signal. If it is determined from the calculated values of the relative damping factor and oscillation period that the PID coefficients need to be changed in order for the controller behaviour to approach the target closed loop second order characteric (zeta=6, $T_{osc}$=2Ti, csi=0.5), then NEWPID calculates the new PID coefficients using csi and $t_{osc}$. The coefficients of the PID controller are then updated and the method of moments based algorithm is then ready to analyse a new transient.

Figure 7:
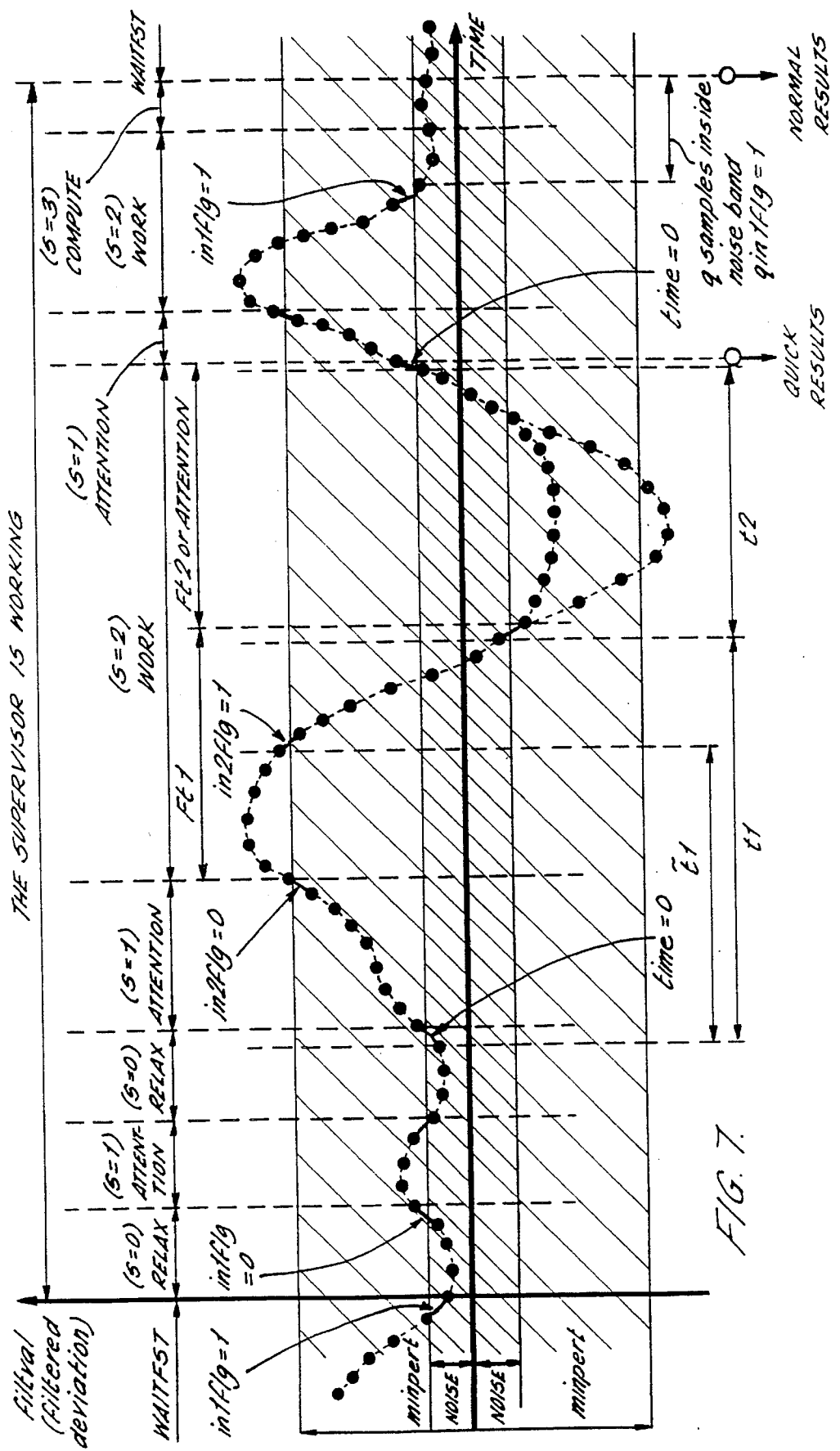
FIG. 7 is a further representation of the operation of the control apparatus on the filtered deviation signal giving further detail.

FIG. 7 illustrates what a deviation signal will look like in practice. A predetermined noise band about the zero deviation level is determined and so long as the deviation signal which is the filtered value filtval is within the noise band about the zero level then it is considered to be at a steady state. A deviation signal level minpert is defined to prevent the false starting of the method of moments based algorithm. When the deviation signal moves out of the noise band then the sampled values are integrated. Whilst the deviation signal is within the noise band then the status level s is set at zero (relax) when the deviation signal enters the minpert band s=1 (attention). If the deviation signal re-enters the noise band then the deviation is not considered significant and no method of moments based identification takes place. When the deviation signal moves out of the minpert band the status level is set to 2 (work). This initiates the method of moments based identification algorithm. The algorithm will continue until either it is determined that the deviation is too oscillatory whereupon the Quick Results procedure will be initiated and the method of moments based identification algorithm restarted, or the deviation signal enters the noise band for a predetermined period of time (q samples). When it is determined that the steady state has been reached, i.e. the deviation signal has remained within the noise band for q samples then the status s is set to 3 (compute) and the method of moments based identification algorithm determines the relative damping factor csi and the oscillation period $t_{osc}$. After this time or before initiation of the method of moments based algorithm the control apparatus enters a quiescent state denoted by WAITFST.

The steps taken by the processor in performing the method of moments based identification algorithm will be described hereinafter with reference to FIGS. 8 to 30 which represent flow diagrams of these steps.

Figure 8:
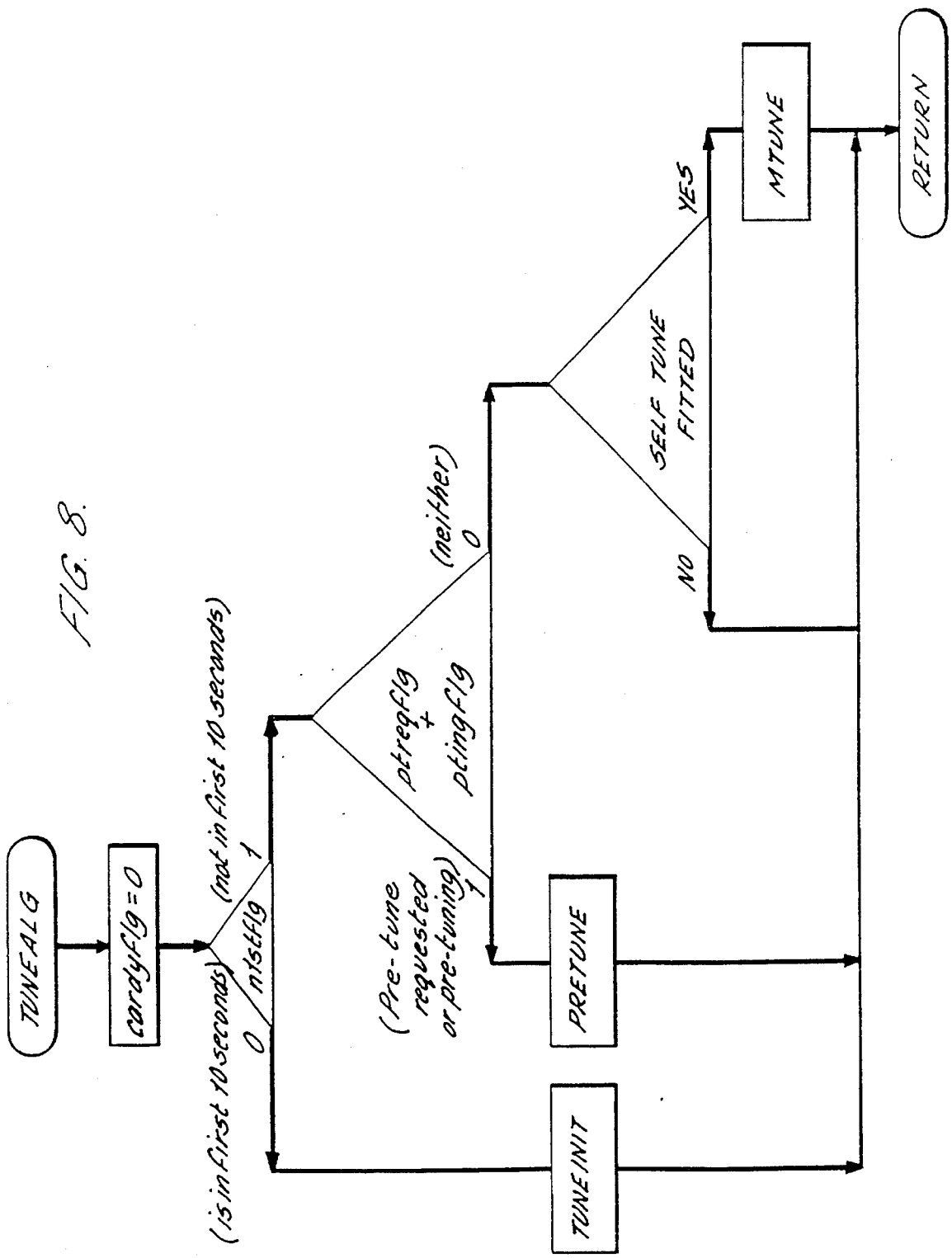
FIG. 8 is a flow diagram of the self-tuning algorithm.

FIG. 8 illustrates the steps undertaken by the PID coefficient tuning algorithm TUNEALG within the process control apparatus 10.

The following table provides a legend for the labels used in FIG. 8.

| | |
|---|---|
| cardyflg | "control ready" flag |
| nistflg | "not in first 10 seconds" flag |
| ptreqflg | "Pre-Tune Requested" flag |
| ptingflg | Pre-Tune in Operation" flag |

Upon initial start-up it is determined whether the control flag is ready, i.e. cardyflg=0. If ready then within the first ten seconds determined by nlstflg=0 an initialisation procedure TUNEINIT is initiated. This procedure resets the registers and initialises the system.

After the first ten seconds (nlstflg=1) it is determined whether either a PRETUNE is requested or a PRETUNE operation is underway, (i.e. if ptreqflg=1 or ptingflg=1). If the pretune is requested or it is in operation then the procedure PRETUNE proceeds. This is a known procedure for providing a rough estimate of the PID coefficients. In the present embodiment this comprises a one shot algorithm of known type.

If the PRETUNE procedure is neither requested nor in operation then it is determined whether the process control apparatus is fitted with a self-tune capability. If not, then the process ends, or if so then the MTUNE procedure is initiated. The MTUNE procedure is the procedure which undertakes the steps of the method of moments based algorithm, Quick Results, Normal Results, and the NEWPID and MNEWPID procedures.

The TUNEALG program is polled continuously, such as several times per second. Thus during the MTUNE procedure if the procedure is terminated at an appropriate point then it will be restarted at the next cycle.

Figure 9:
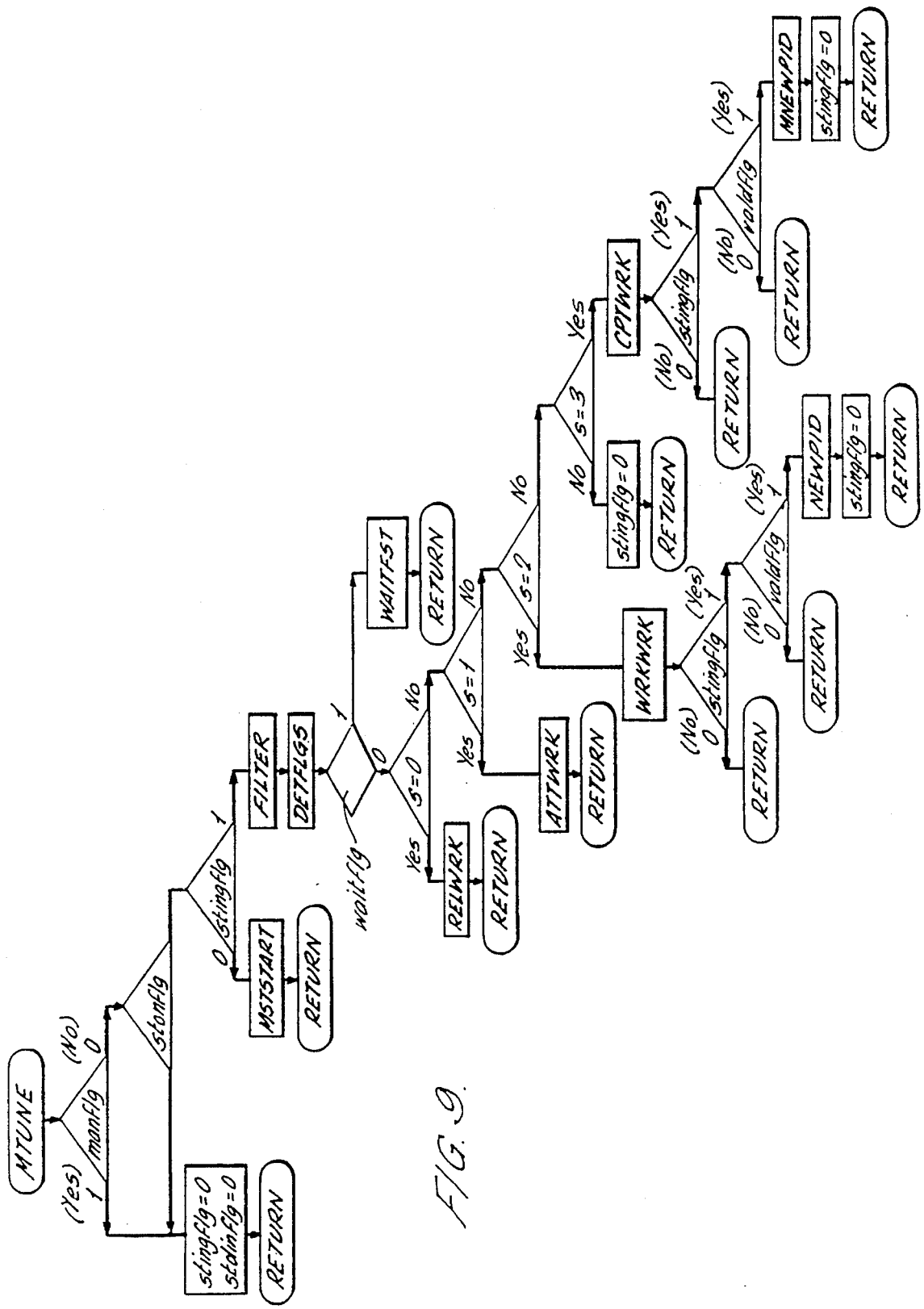
FIG. 9 is a flow diagram of the mtune procedure.

FIG. 9 is a flow diagram of the steps undertaken by the MTUNE procedure.

The following provides a legend for the label used in FIG. 9.

| KEYS TO FLAGS | |
|---|---|
| manflg | Manual Mode Enabled flag |
| stonflg | Self-Tune Mode Enabled (ON) flag |
| stingflg | Self Tuning in Progress flag |
| stdlnflg | Self-Tune Data Initialised flag |
| waitflg | Waiting flag |
| valdflg | Valid Data Ready flag |
| Supervisor States | |
| s = 0 | Relax work |
| s = 1 | Attention Work |
| s = 2 | Work Work |
| s = 3 | Compute Work |

| KEYS TO FUNCTIONS | |
|---|---|
| MSTSTART | MOMENT SELF TUNE START: Called at the start of each self tune identification cycle. Initialises the self-tune flags and parameters and forces a new self-tune cycle to commence. |
| FILTER | FILTER THE NEW DEVIATION VALUE: Obtains a filtered deviation value (from new raw deviation value) for use by remainder of the identification cycle. |
| DETFLGS | DETERMINE FLAGS: Called each time a new deviation value is obtained. Determines the deviation band in which the current deviation is situated. |
| WAITEST | WAIT FOR START: Forces the identification cycle to start from a minimum deviation point. |
| RELWRK | RELAX WORK: The quiescent state of the self tune identification section, no active self-tune work occurs in this state. |
| ATTWRK | ATTENTION WORK: Invoked when deviation starts to stray from steady state. Accumulates moment data on the proviso that current deviation becomes sufficiently large to be classified as a disturbance. Otherwise steady state is regained and moments data is discarded. |
| WRKWRK | WORK WORK: Invoked when deviation is definitely recognised as a disturbance. Continues to gather moment data that started in ATTWORK, monitors deviation waveform and asses appropriate point in time to complete identification. |
| CPTWORK | COMPUTE WORK: Invoked from WRKWRK. Computes the values of tosc and csl to be used as input to design section. |
| NEWPID | CALCULATE NEW PID TERMS (based on quick results): Invoked by WRKWRK. Calculates new PID terms based on current terms and new values of tosc and zeta. |
| MNEWPID | CALCULATE NEW PID TERMS 2 (based on normal results): Invoked by CPTWRK. Calculates new PID terms based on current terms and new values of tosc and csl. |

When the MTUNE procedure is initiated it is determined whether the system is set in manual mode (manflg=1). If so, the self-tuning in process flag and the self-tune data initialised flag are set to zero (stingfig=0 and stdinflg=0) and the MTUNE procedure is terminated.

Figure 10:
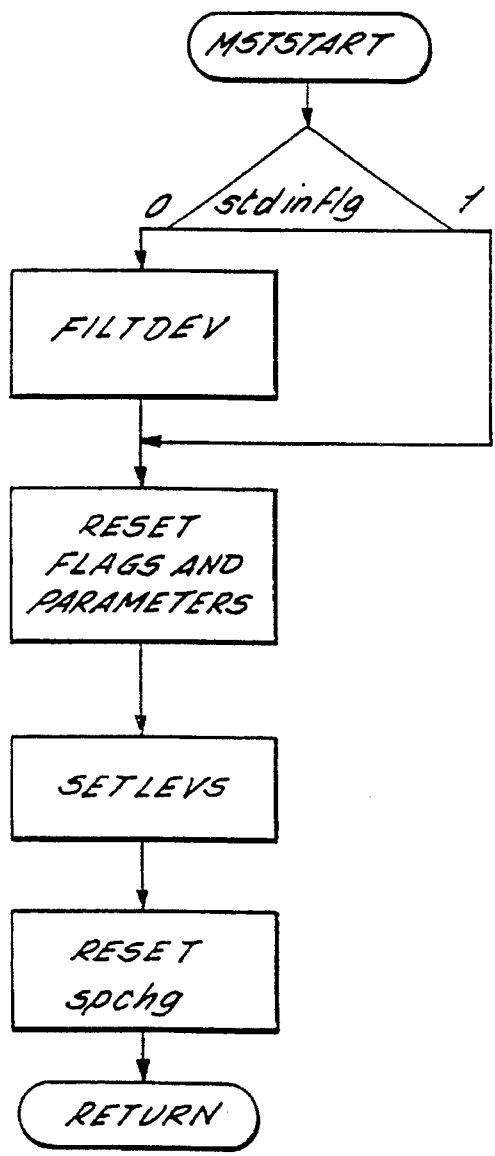
FIG. 10 is a flow diagram of the mststart procedure.

If the manual mode enabled flag manflg=0 then it is determined whether the self-tune mode enabled flag is on or off. If the self-tune mode is disabled (stonflg=0) then once again the self-tuning in process flag and the self-tune data initialised flag are set to zero. If the self-tune enabled flag is on then it is determined whether self-tuning is in progress (i.e. does stingflg=1). If self-tuning is not in progress then the moment self-tune start (MSTSTART) procedure is initiated. This initialises the self-tune flags and parameters and forces a new self-tune cycle to commence. The MSTSTART procedure is illustrated in FIG. 10 and will be described hereinafter. Once the MSTSTART procedure has completed then the program exits the MTUNE procedure.

If it is determined that self-tuning is in progress (stingfig=1) then the FILTER procedure is initiated. This obtains a filtered deviation value from the raw deviation value for use in the remainder of the identification cycle.

Then the determine flags (DETFLGS) procedure is called each time a new filtered deviation value is obtained. This determines the deviation band in which the current deviation value is situated.

It is then determined whether the waiting flag waitflg is set or not. If the waiting flag is set then the wait for start WAITFST procedure is initiated. This forces the identification cycle to start from a minimum deviation point. The purpose of this procedure is to ensure that the method of moments based algorithm is only started when the filtered deviation signal is at or close to zero.

If the filtered deviation signal is at or close to zero then the wait flag (waitfig) is set to zero and it is determined whether the supervisor state is in the relax work state (s=0). If so, then the relax work (RELWRK) procedure is initiated. This is the quiescent state of the self-tune identification section. No active self-tune work occurs in this state. Once the RELWRK procedure has completed the program exits the MTUNE procedure.

If it is determined that s is not zero then if the supervisor state is in the attention work (s=1) state then the attention work (ATTWRK) procedure is invoked. The procedure is invoked when the deviation starts to stray from the steady state and it accumulates moment data on the proviso that the current deviation becomes sufficiently large to be classified as a disturbance. If the deviation does not become sufficiently large to be classified as a disturbance when steady state is regained the moments data is discarded. Once the attention work procedure is completed the MTUNE procedure is exited.

If the supervisor state is not in the attention work state (s=1) but is in the work work state (s=2) then the work work procedure is invoked. This procedure is invoked when the deviation is definitely recognised as a disturbance and continues to gather moment data that started in the attention work procedure. The procedure monitors the deviation waveform and assesses the appropriate point in time to complete the method of moments based identification process. Once the work work procedure is completed it is determined whether the self-tuning and progress flag stingflg is set and whether the valid data ready flag is set. If not, then the MTUNE procedure is exited otherwise the new PID terms (NEWPID) procedure is initiated. This procedure calculates the NEWPID coefficients based on the values for zeta and $t_{osc}$ calculated by the Quick Results procedure undertaken during the ft2 procedure called during the work work procedure. The self-tuning in progress flag stingflg is then set to zero and the MTUNE procedure exited.

If the supervisor state is set to compute work (s=3) then the compute work procedure is initiated. This procedure is invoked from the work work procedure which increments the supervisor states status and this procedure computes the values of csi and $t_{osc}$ using the method of moments based algorithm. Following the compute work procedure it is determined whether the self-tuning in progress flag and the validate ready flag are set. If not, then the MTUNE procedure is exited otherwise the calculate New PID terms 2 (MNEWPID) procedure is initiated. The calculate MNEWPID procedure calculates the new PID terms based on the new values of csi and $t_{osc}$ provided from the Normal Results procedure undertaken in the compute work procedure. When the values for csi and $t_{osc}$ have been calculated the self-tuning in progress flag is set to zero and the MTUNE procedure exited.

If following the above procedures it is determined that the supervisor state is neither 0, 1, 2 or 3, then the self-tuning in progress flag is set to zero and the MTUNE procedure exited.

FIG. 10 is a flow diagram of the moments self-tune start (MSTSTART) procedure. This routine is called whenever the MTUNE procedure is in its inactive state and it is used to reset the MTUNE flag and parameters. When this routine is called it forces the self-tune algorithm to become active.

In the MSTSTART procedure it is determined whether the self-tune data initialise flag is set. If not, then the filtered deviation FILTDEV procedure is initiated. This procedure starts the filtering of the deviation signal. Then the self-tune flags and parameters are reset and the set levels SETLEVS procedure initiated.

The SETLEVS procedure determines the minpert, noise and the number q of samples as shown in FIG. 7. If the stdinflg flag upon entry to MSTSTART procedure is set to 1 then the FILTDEV procedure is bypassed.

The set point change detector flag is then reset before the MSTSTART procedure is exited.

Figure 11:
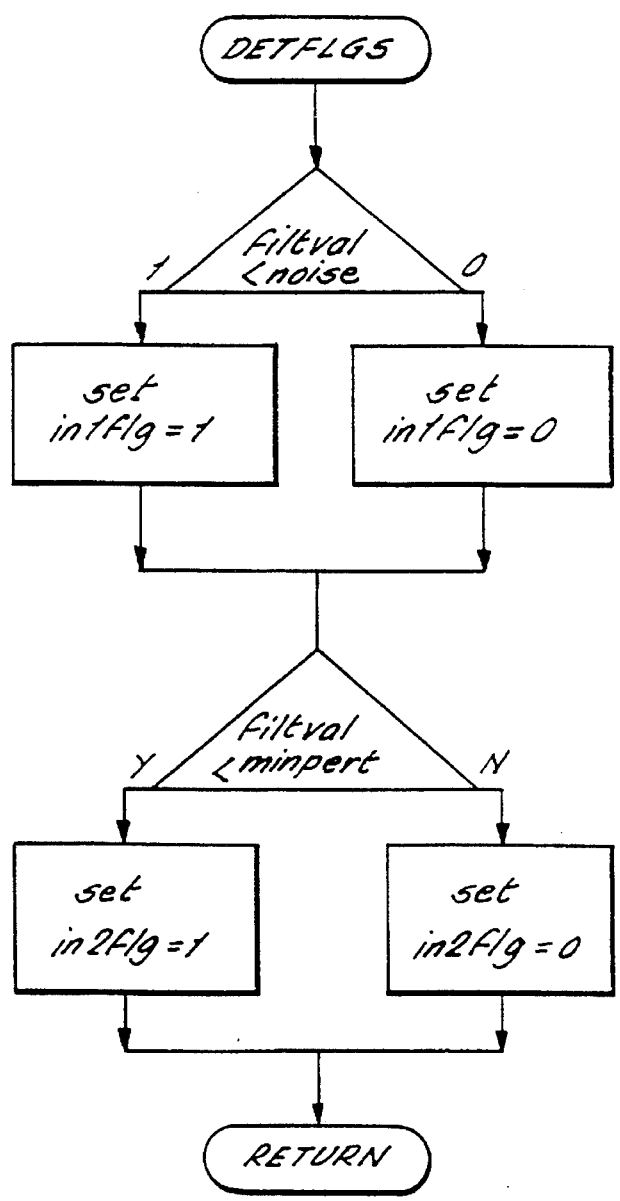
FIG. 11 is a flow diagram of the detflgs procedure.

FIG. 11 illustrates the steps undertaken during the determine flags (DETFLGS) procedure. In this procedure it is determined whether the filter value of the deviation signal is less than the noise band. If so, then the flag in1flg is set to 1 otherwise it is set to zero. It is then determined whether the filter deviation value is within the minpert band shown in FIG. 7. If so, the in2flg flag is set to 1 otherwise it is set to zero.

Figure 12:
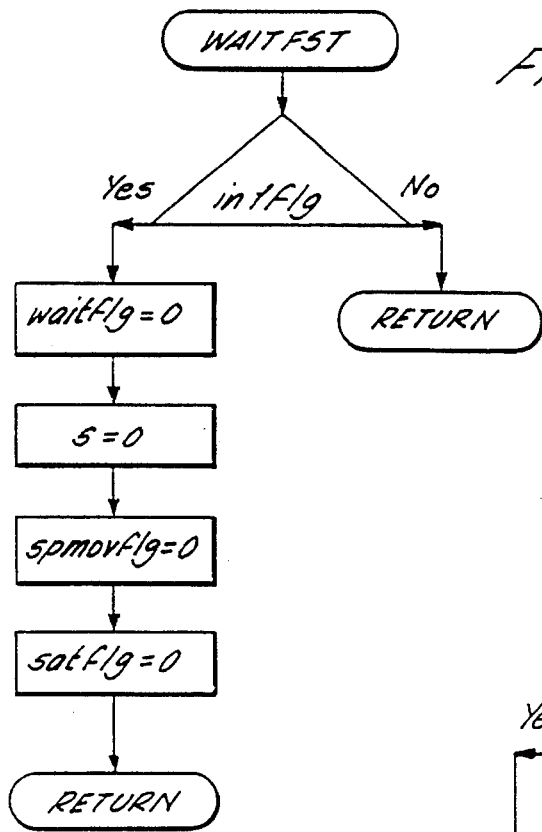
FIG. 12 is a flow diagram of the waitfst procedure.

FIG. 12 illustrates the wait for start (WAITFST) procedure. This procedure does nothing if the deviation is outside the noise band (when in1flg=1). When the deviation is inside the noise band for the first time it resets the waitflg flag and the supervisor state flag. By setting the supervisor state to s=0 this will initiate the relax work (RELWRK) procedure.

Figure 13:
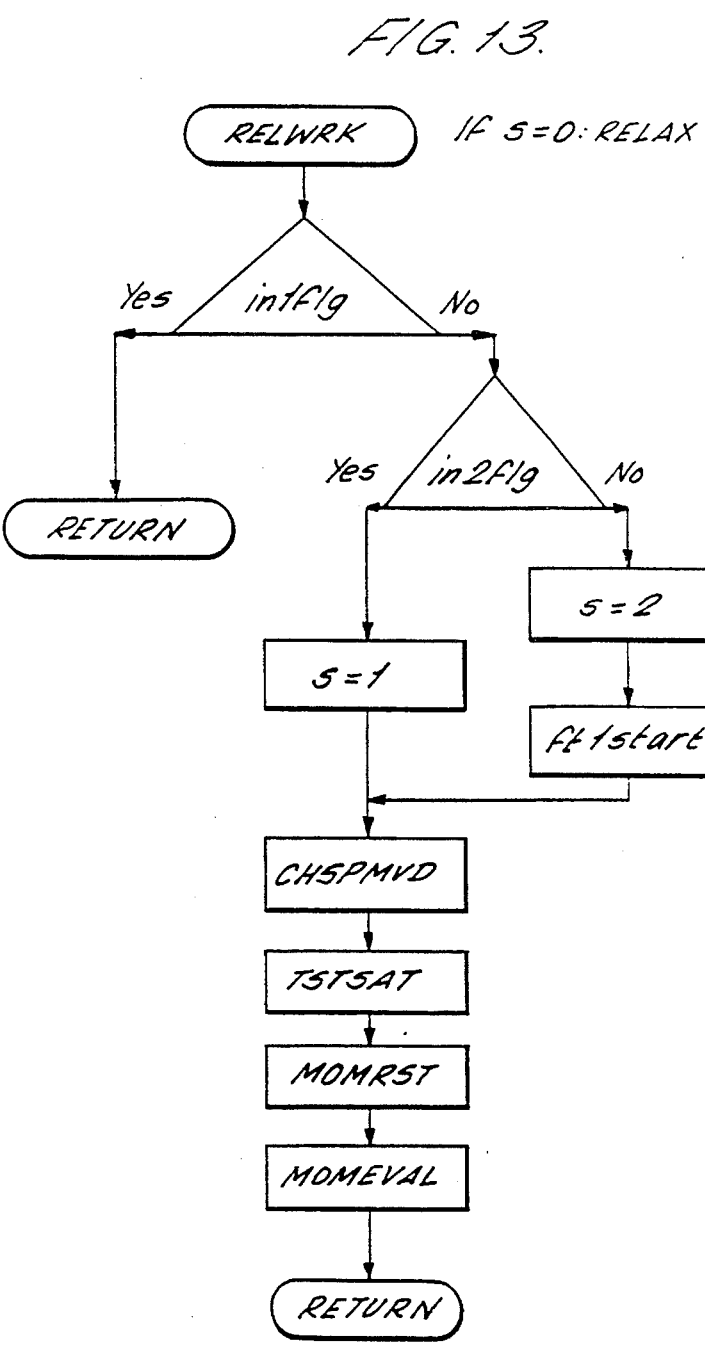
FIG. 13 is a flow diagram of the relwrk procedure.

The RELWRK procedure is illustrated in FIG. 13. In this state nothing happens until a deviation from within the noise band about zero occurs. If the deviation signal is within the noise band (in1flg=1) the procedure is exited. Otherwise, it is determined whether the deviation signal is within the minpert band. If so, the supervisor state is changed to s=1 (attention work), otherwise if the deviation signal is outside the minpert band then the supervisor state is moved to the work work s=2 state and the Ft1START procedure is invoked. This procedure is illustrated in the flow diagram in FIG. 16. The procedure then invokes the check for set point move (CHSPMVD) procedure followed by the test for power saturation (TSTSAT) procedure, the moment restart (MOMRST) procedure and the moment evaluation (MOMEVAL) procedure. These procedures are illustrated in FIGS. 21, 22, 25 and 26 respectively.

Figure 14:
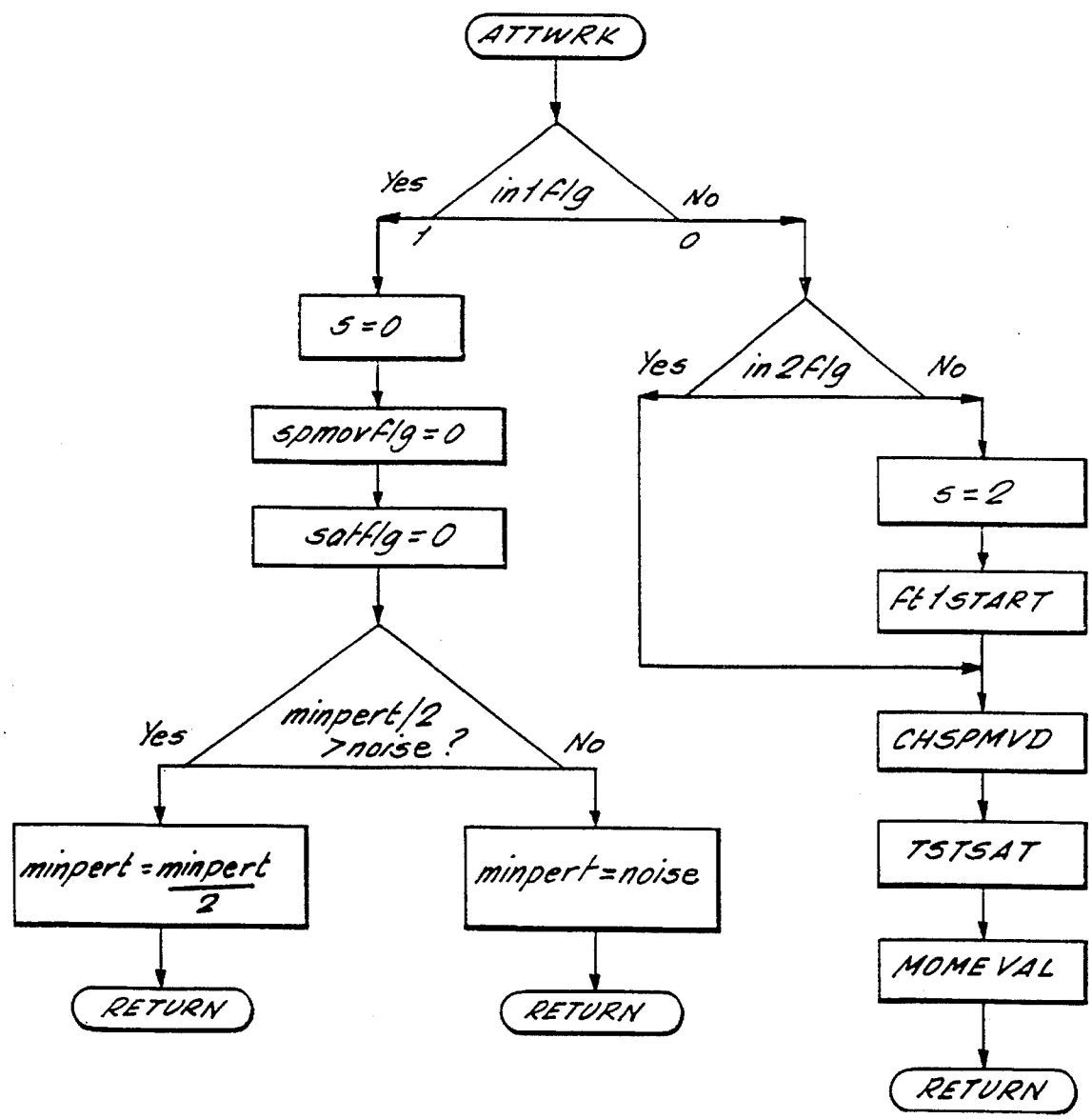
FIG. 14 is a flow diagram of the attwrk procedure.

FIG. 14 illustrates a flow diagram of the attention work ATTWRK procedure. In this procedure it is determined whether the deviation is within the noise band. If so, the supervisor state is set to s=0, the set point move flag (spmovflg) is set to zero and the saturation flag (satflg) is set to zero. It is then determined if the minpert value is greater than twice the noise level. If so, then the minpert level is divided by 2. Otherwise the minpert level is set to equal the noise level. This lowering of the minpert level prevents the oscillation of the filter deviation signal within the minpert band.

Figure 16:
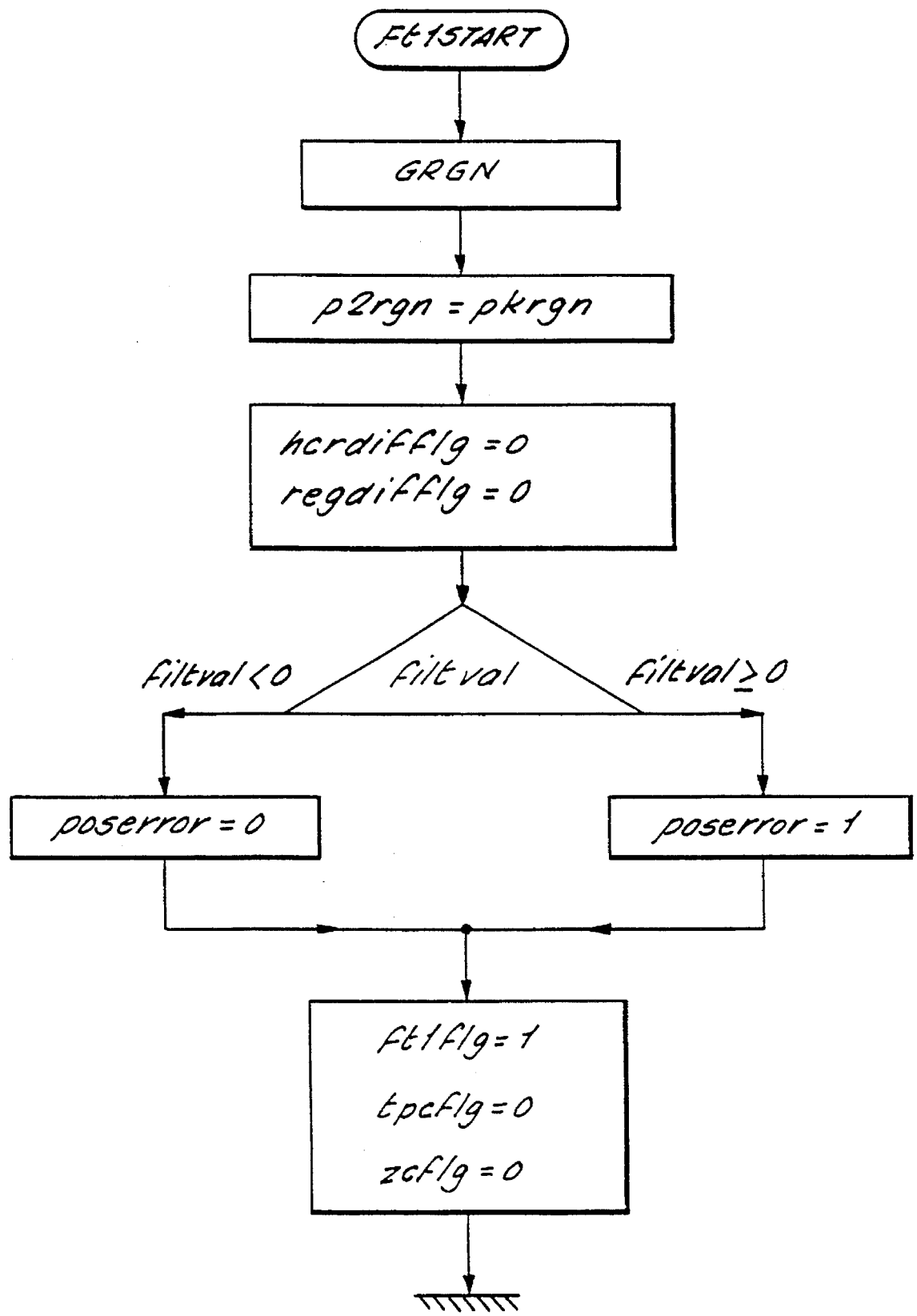
FIG. 16 is a flow diagram of the ftlstart procedure.

If it is determined upon entry into the ATTWRK procedure and the deviation level is greater than the noise band then it is determined whether the deviation level is within the minpert band. If not, then the supervisor state is moved to the work work state s=2 and the Ft1START procedure is invoked. The Ft1START procedure is illustrated in FIG. 16. If the deviation signal is within the minpert band then the supervisor state is not changed nor is the Ft1START procedure invoked. The check set point moved procedure, the test saturation procedure and the moment evaluation procedure are then invoked.

Figure 15:
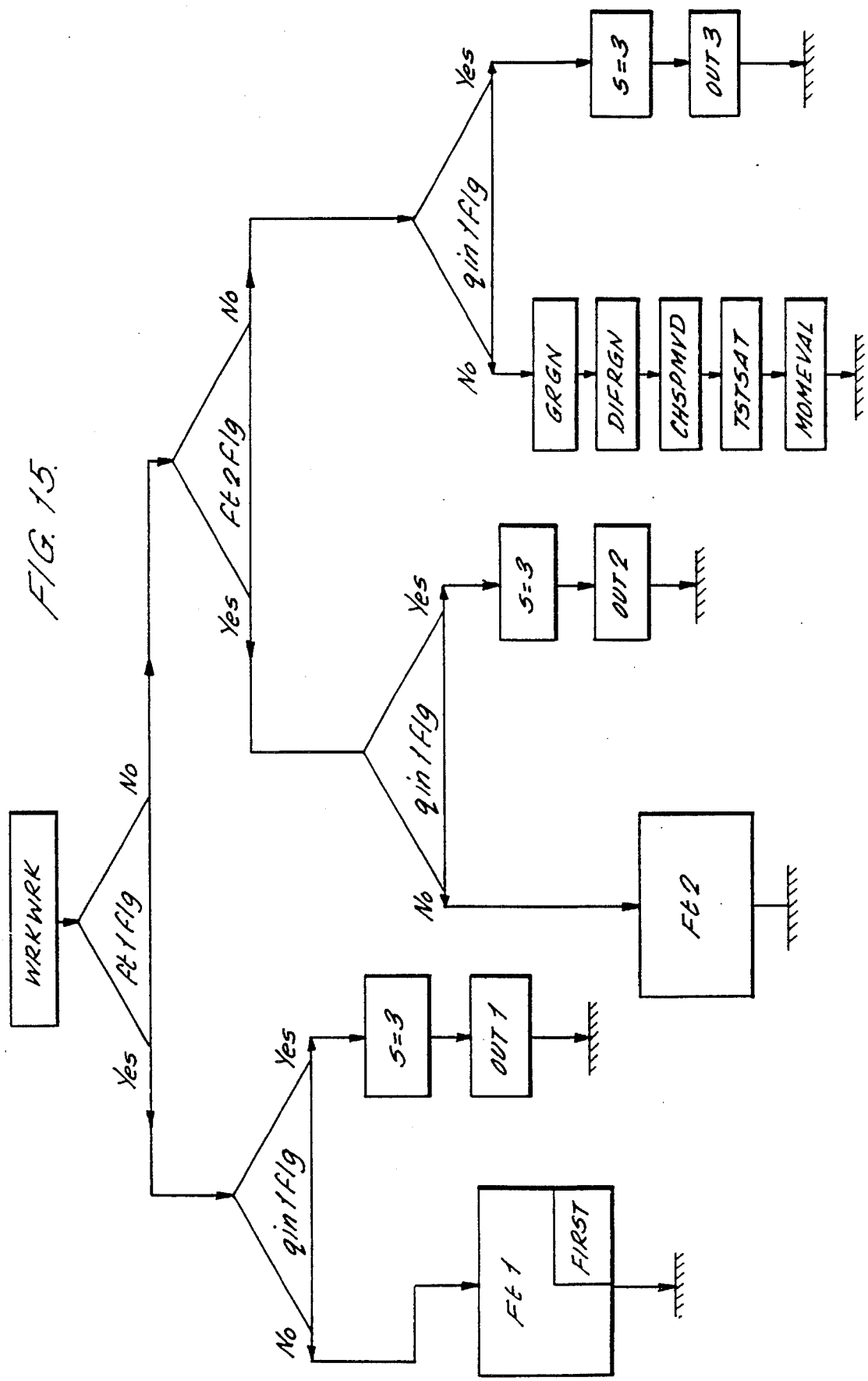
FIG. 15 is a flow diagram of the wrkwrk procedure.

FIG. 15 illustrates the steps undertaken by the WRKWRK procedure. This procedure identifies the times $t_1$ and $t_2$ which are the times at which the deviation signal crosses the zero after the first positive and negative excursions.

Within the WRKWRK procedure the ft1flg flag is checked to see whether $t_1$ is being found. If so, then the qin1flg is checked to see whether the deviation is at a steady state. If not then the Ft1 procedure is initiated. If the deviation signal is at a steady state then the supervisor state is changed to compute work s=3 and the OUT1 procedure initiated.

If upon entry into the WRKWRK procedure it is determined that the ft1flg is zero then the ft2flg is checked. If this is high then it is determined whether the deviation is at a steady state (qin1flg=1) and if not the Ft2 procedure is initiated. If the deviation signal is at a steady state then the supervisor state is moved to compute work s=3 and the OUT2 procedure initiated. If the ft2flg is low then the qin1flg flag is checked, If this is low then the supervisor state is moved to compute work s=3 and the OUT3 procedure initiated. Otherwise the GRGN procedure, the DIFRGN procedure, the CHSPMVD procedure, the PSTSAT procedure and the MOVEVAL procedure are initiated.

FIG. 16 illustrates the steps undertaken in the Ft1START procedure. This procedure resets all flags to passive conditions and initialises the record of the power region to whatever is current.

Figure 23:
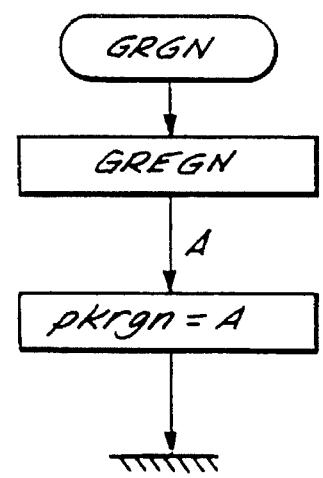
FIG. 23 s a flow diagram of the grgn procedure.

In the Ft1START procedure the GRGN procedure is first initiated to get the current power region. The GRGN procedure is illustrated in FIG. 23. The heat cool region difference flag hcrdifflg and the region difference flag regdifflg are then set to zero. If the filter value is greater than zero then the positive error flag poserror is set to zero otherwise it is set to 1. The flag ft1flg is then set to zero and the flags tpcflg and zcflg (time minpert crossing flag and zero crossing flag respectively) are set to zero.

Figure 17:
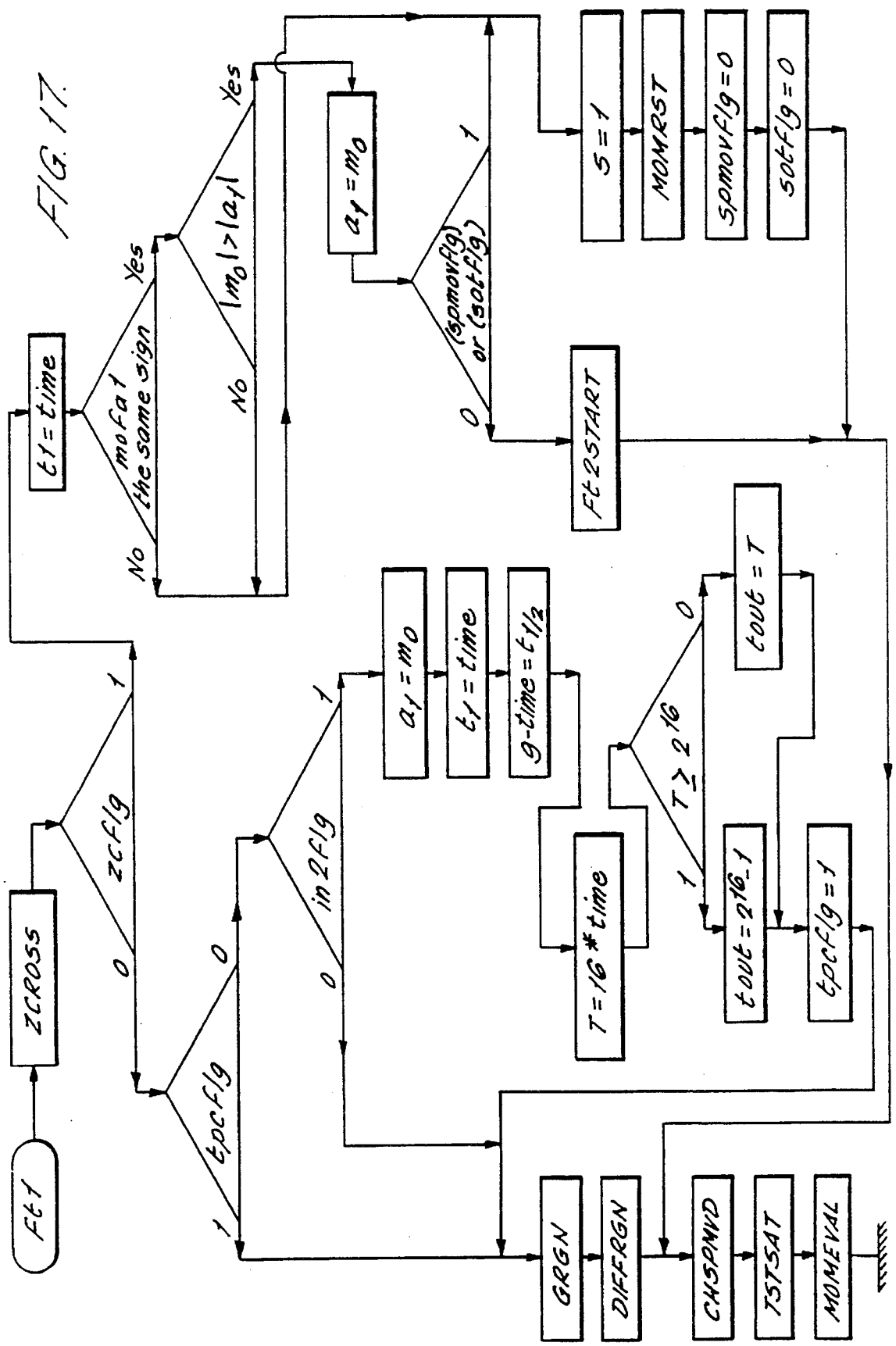
FIG. 17 is a flow diagram of the ft1 procedure.

FIG. 17 illustrates the Ft1 procedure. This routine tracks the deviation and finds the time taken from the point the deviation first becomes greater than the noise band to the point that the deviation crosses zero and again becomes greater than the noise band in the opposite direction. When $t_1$ has been found the procedure Ft2 will then normally be invoked to find $t_2$.

In the Ft1 procedure the ZCROSS procedure checks for the zero crossing by the deviation signal. If the deviation signal has crossed the zero then the zcflg flag is set to 1. If the deviation has not crossed the noise band the tpcflg flag is checked to see whether the deviation has crossed the minpert band. If so, then the GRGN procedure, the DIFRGN procedure, the CHSPMVD procedure, the TSTSAP procedure and the MOMEVAL procedure are initiated. Otherwise, it is determined whether the deviation is greater than or less than the minpert band. If it is less than the minpert band then various flags are set including the minpert crossed flag tcpflg=1.

If it is determined that the deviation has crossed the noise band (zcflg=1) and it is determined whether the set point has moved or the power is saturated (spmovflg and sapflg) are checked. If either of these are high then the supervisor state is moved to attention work s=1 and the moment restart MOMRST procedure is initiated. Also the set point move flag spmovflg is set to zero and the saturation flag satflg is set to zero. If it is determined that there is no power saturation and the set point is not moved then the Ft2START procedure is initiated.

Figure 18:
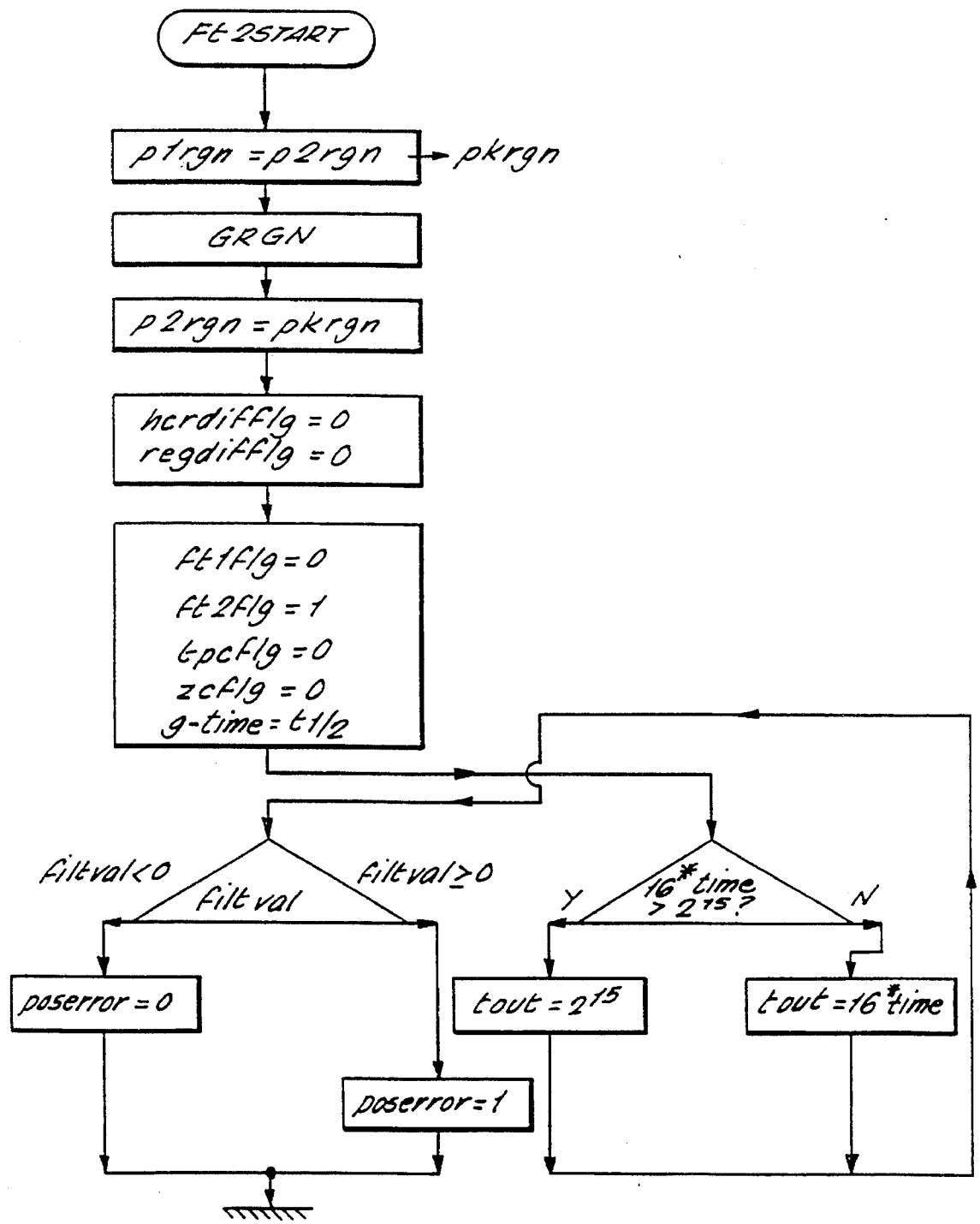
FIG. 18 is a flow diagram of the ft2start procedure.

FIG. 18 illustrates the steps undertaken by Ft2START procedure. This sets the condition of a number of flags to a passive condition and also saves the power region from $t_1$ and re-initialises the power region to whatever is current. In this procedure the heat cool region difference flag and the region difference flag are set to zero. Also the ft1flg and the cpsflg are set to zero and the ft2flg is set to 1. The zcflg is set to zero and the q time is set to a half of $t_1$. It is then determined whether the filter value is greater than zero. If so, the positive error flag poserror is set to zero. Otherwise it is set to 1.

Figure 19:
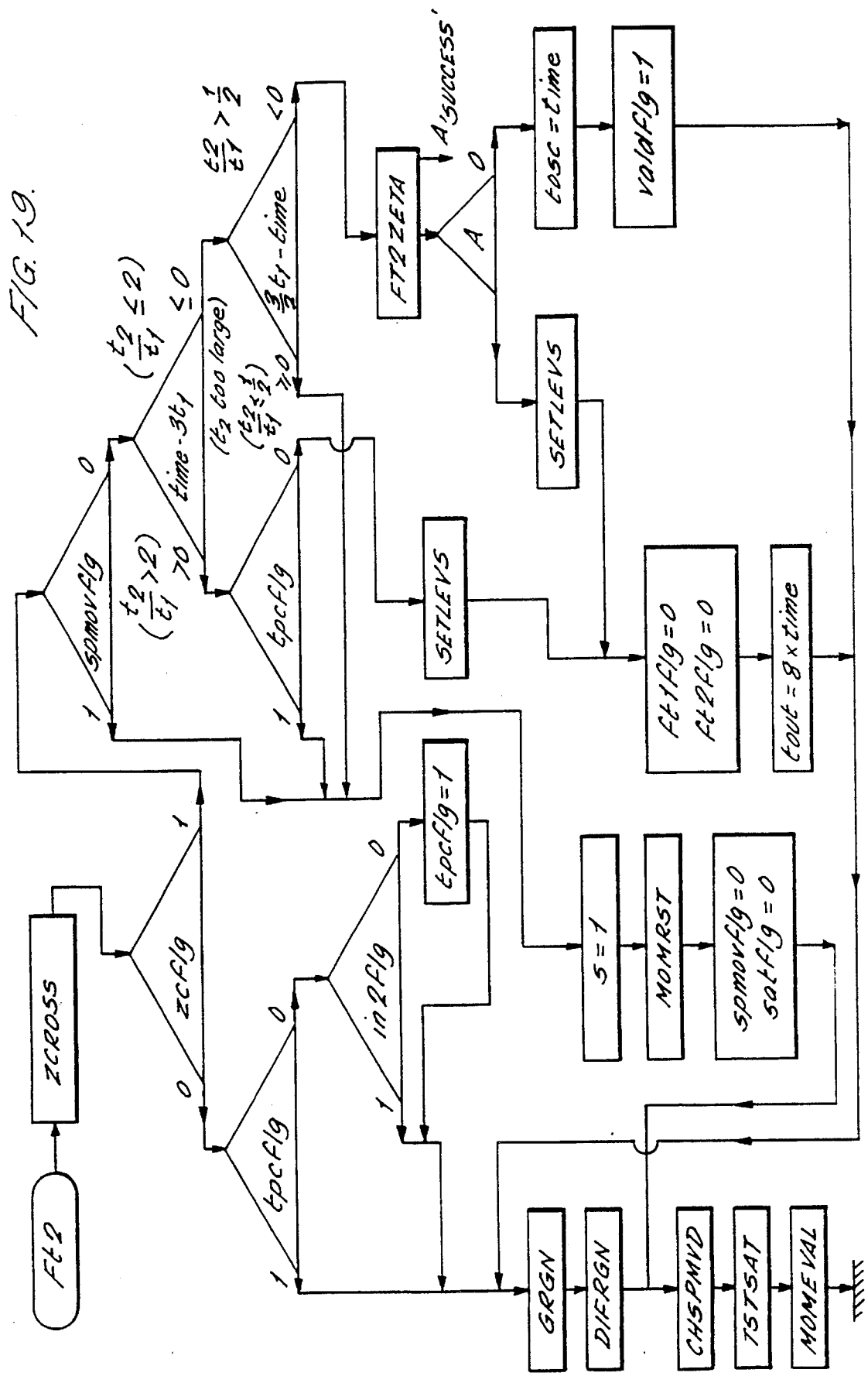
FIG. 19 is a flow diagram of the ft2 procedure.

FIG. 19 illustrates the Ft2 procedure. This machine is invoked after the first half cycle of the transient has been detected and characterised to provide $t_1$. This routine tracks the second half cycle and characterises it in a similar manner to Ft1 to provide $t_2$. The moments are continuously gathered until a zero crossing is detected. The only event that is significant for the zero crossing is whether the deviation exceeds the minpert band. If it does, the tpcflg is set. This routine may be completed before a zero crossing if the moment evaluation times out and the self-tune is aborted, or if the work work procedure detects that the deviation has been in the noise band for q time then supervisor state 3 is invoked.

If and when a zero crossing is detected the finding $t_2$ part of this routine is complete. Several checks now need to be done, these are 1) If the set point is moved during the finding of $t_1$ then analysis of this cycle is terminated and the system can be set back to supervisor state 1 looking for the first zero crossing so that it can start analysing again.

2) If $t_2$ is much greater or smaller than $t_1$ then analysis of this cycle is terminated and the system is set back to supervisor state 1 looking for the first zero crossing so that it can start analysing again.

3) If $t_2$ is roughly equal to $t_1$ then terms for $t_{osc}$ and zeta are calculated by Ft2, i.e. Quick Result.

4) If the deviation during $t_2$ never exceeds the minpert band then a new time-out period is set, $t_2$ and $t_2$ are no longer valid and ongoing work is continued back in the work work procedure.

In the Ft2 procedure it is determined whether the deviation is across the minpert band. If not, it is determined whether the time minpert crossing flag has been set (tpcflg=1). If not, then it is determined whether the deviation is within the minpert band (in2flg=1). If not, then the time minpert crossing flag is set to 1 since the minpert band must just have been crossed.

The GRGN procedure, the DIFRGN procedure, the CHSPMVD procedure, the TSTSAT procedure and the MOMEVAL procedure are then initiated. If the zero crossing has occurred then the set point move flag is checked. If there has been a change in set point then the moment evaluation is reset as is the spmovflg and the satflg.

If there has been no set point change it is determined whether $t_2$ is very much greater or smaller than $t_1$. If this is so, then no Quick Result is undertaken. The moment evaluation must be undertaken in compute work.

If $t_1$ is approximately equal to $t_2$ then the FT2ZETA procedure is initiated. This calculates a value for zeta using $t_1$ and $t_2$ together with the ratio of the areas of the first positive and negative peaks.

Figure 20:
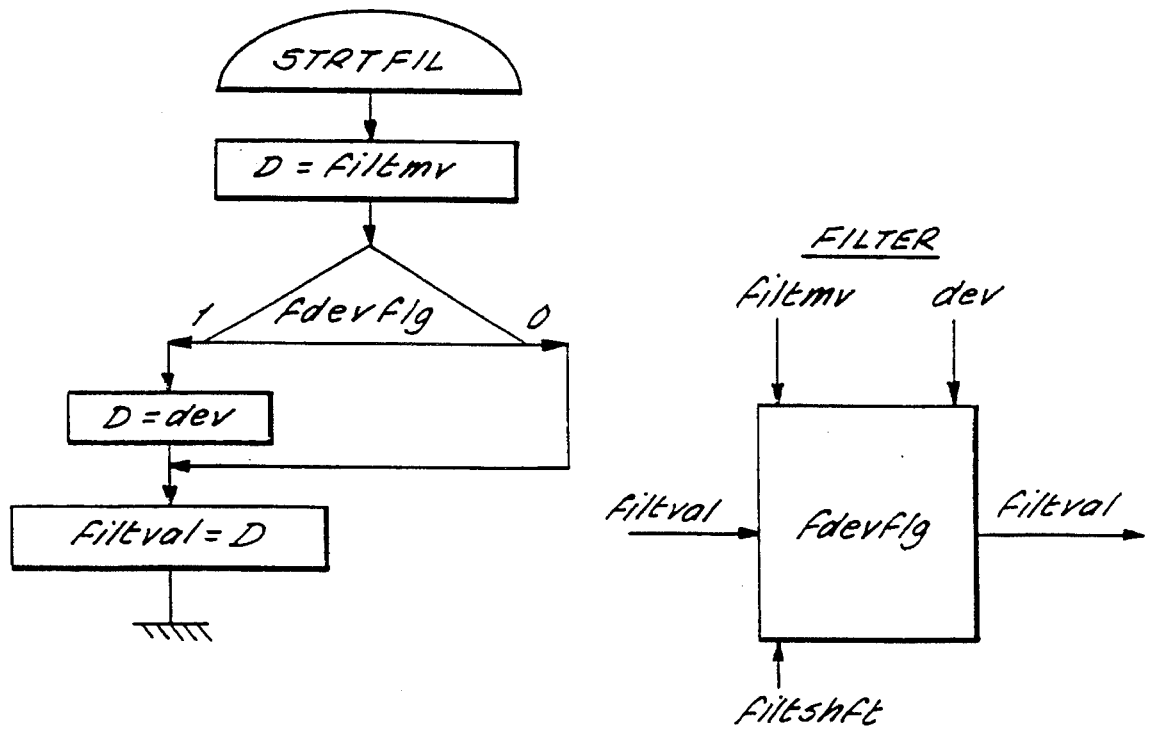
FIG. 20 are flow diagrams of the filter procedures.
Figure 20:
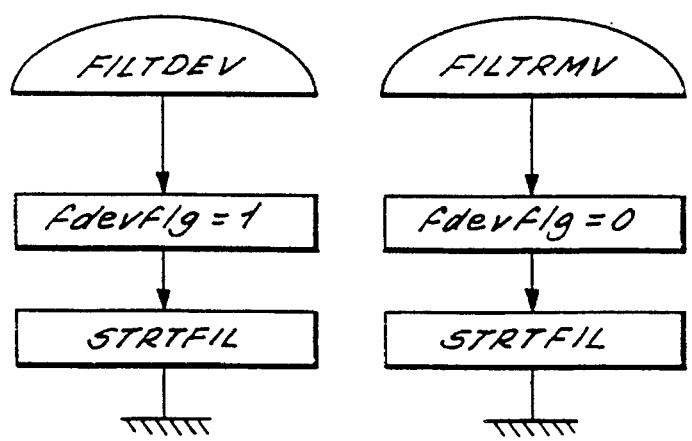

FIG. 20 illustrates the FILTER procedures FILTDEV, FILTRMV and STRTFL. These flow diagrams illustrate the steps undertaken in order to obtain the filtered deviation value.

Figure 21:
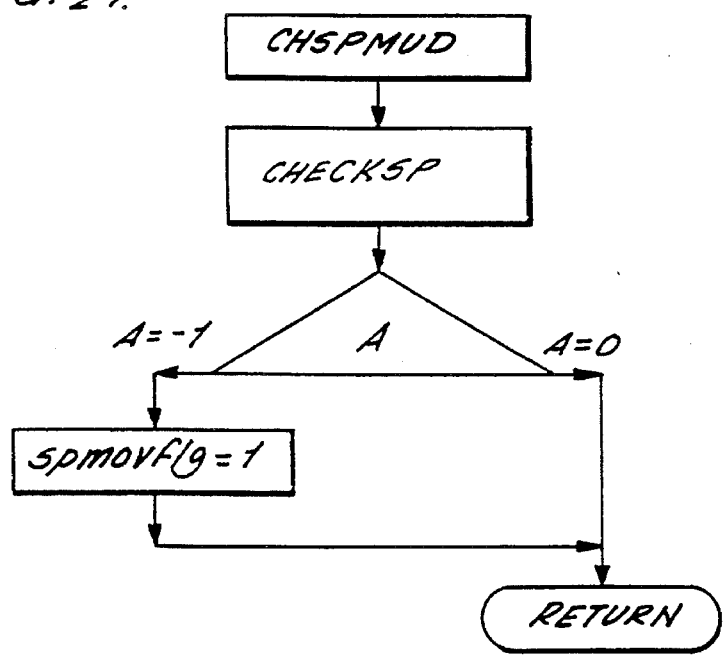
FIG. 21 is a flow diagram of the chspmvd procedure.

FIG. 21 illustrates the check set point move CHSPMAD procedure. This procedure checks to see whether the set point has changed. If there has been a change in the set point then the set point move flag is set (spmovflg =1).

Figure 22:
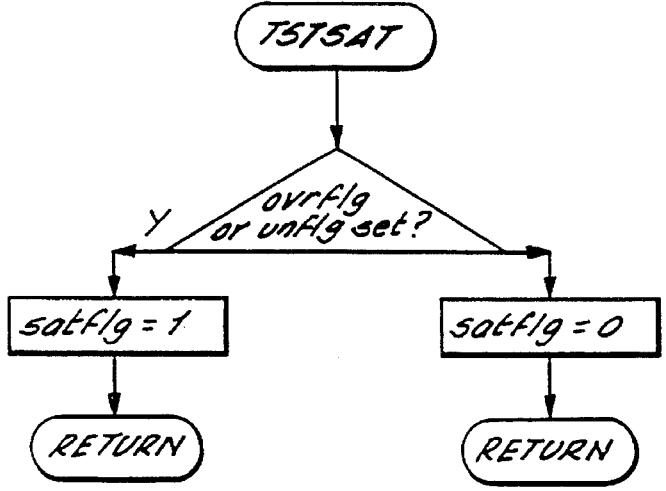
FIG. 22 is a flow diagram of the tstsat procedure.

FIG. 22 illustrates the test saturation TSTSAT procedure. It is determined whether the output power from the PID algorithm is saturated. If so, the satflg flag is set.

FIG. 23 illustrates the GRGN procedure which sets PKREGN to the current power region. GREGN procedure determines the current power region and for a heat only instrument

| A = | 1 inside heating region |
|---|---|
| = | −4 heat saturated off |
| = | −3 heat saturated on |
| = | 0 if just no heat |

For a heat/cool instrument

| A = | 0 in dead band |
|---|---|
| = | 1 in heat only |
| = | 2 in cool only |
| = | 3 in overlap |
| = | −3 in saturated heat |
| = | −2 in saturated cool |

Figure 24:
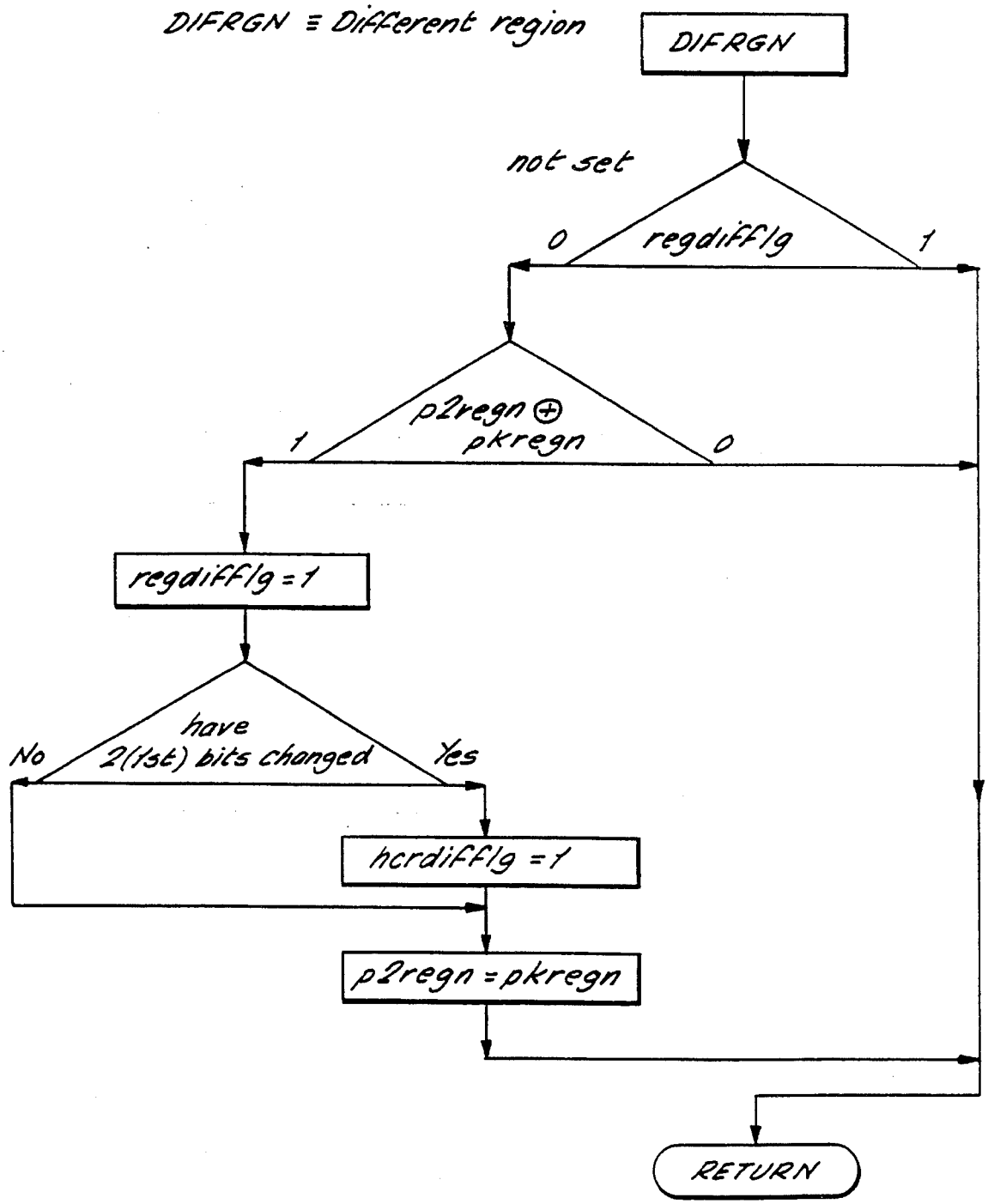
FIG. 24 s a flow diagram of the difrgn procedure.

FIG. 24 illustrates the different region DIFRGN procedure. This routine analyses the current power region and assesses whether it is in a different region from the last time. If it is then the region difference flag regdifflg is set and if the difference is from heat to cool then the heat cool region difference flag hcrdifflg is also set.

Figure 25:
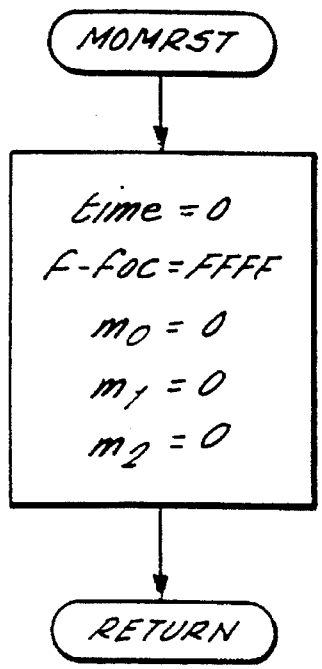
FIG. 25 s a flow diagram of the momrst procedure.

FIG. 25 illustrates the moment reset MOMRST procedure. This procedure ws called prior to ongoing work commencing and resets parameters that are required forongoing moment evaluation. The time is set to zero as are the moments MO, M1 and M2.

Figure 26:
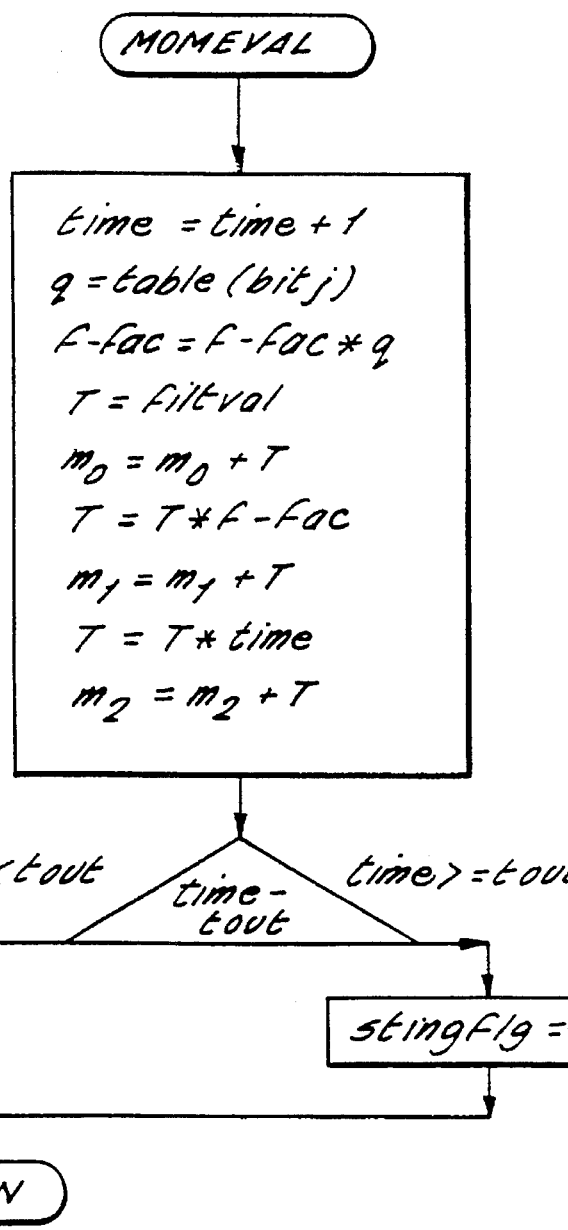
FIG. 26 s a flow diagram of the momeval procedure.

FIG. 26 illustrates the moment evaluation MOMEVAL procedure. This routine is called as part of ongoing work. It gathers the main source of information for assessing the characteristic of the transient. The information is gathered by integrating the deviation signal every sample. It stores the integrated deviation in three variables called moments. M0 is the pure integral of the deviation between the start and finish of the process analysis. M1 is the integral of the deviation with a bias on deviation samples gathered at the start of the process analaysis. M2 is the integral of the deviation with a bias on deviation samples gathered someway through the middle of the process analysis dependent on the value of $\alpha$ used in the weighting function. The value for $\alpha$ can be changed dynamicaly (as is done in FIG. 27) to select the part of the deviation signal that is given the most importance.

In this procedure time is incremented and the moments M0, M1 and M2 are built up by summing the filter deviation values filtval.

Figure 27:
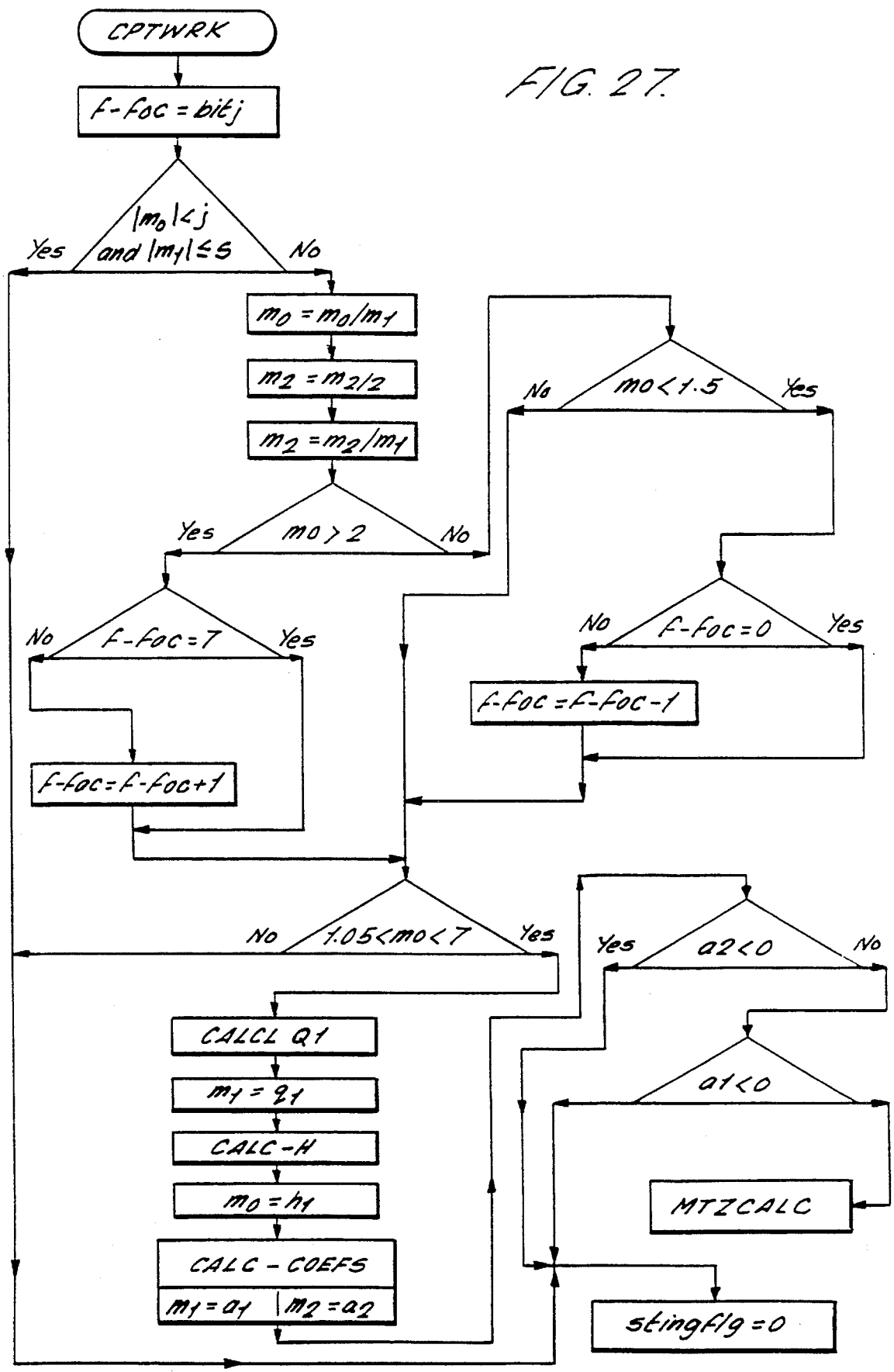
FIG. 27 is a flow diagram of the cptwrk procedure.

FIG. 27 illustrates the steps undertaken by the compute work CPTWRK procedure. This procedure is invoked after moment evaluation has taken place. This routine computes the values of $t_{osc}$ and csi using the moments.

In order to calculate a $t_{osc}$ and csi M0 is divided by M1, M2 is first divided by 2 and then by M1. Values for q1 and h1 as considered in the theory given hereinabove are then found and used to calculate the coefficients $a_1$ and $a_2$. Using the values of $a_1$ and $a_2$ the MTZCALC procedure then calculates the values for zeta and $t_{osc}$ using equations given in the theory described hereinabove.

Figure 28:
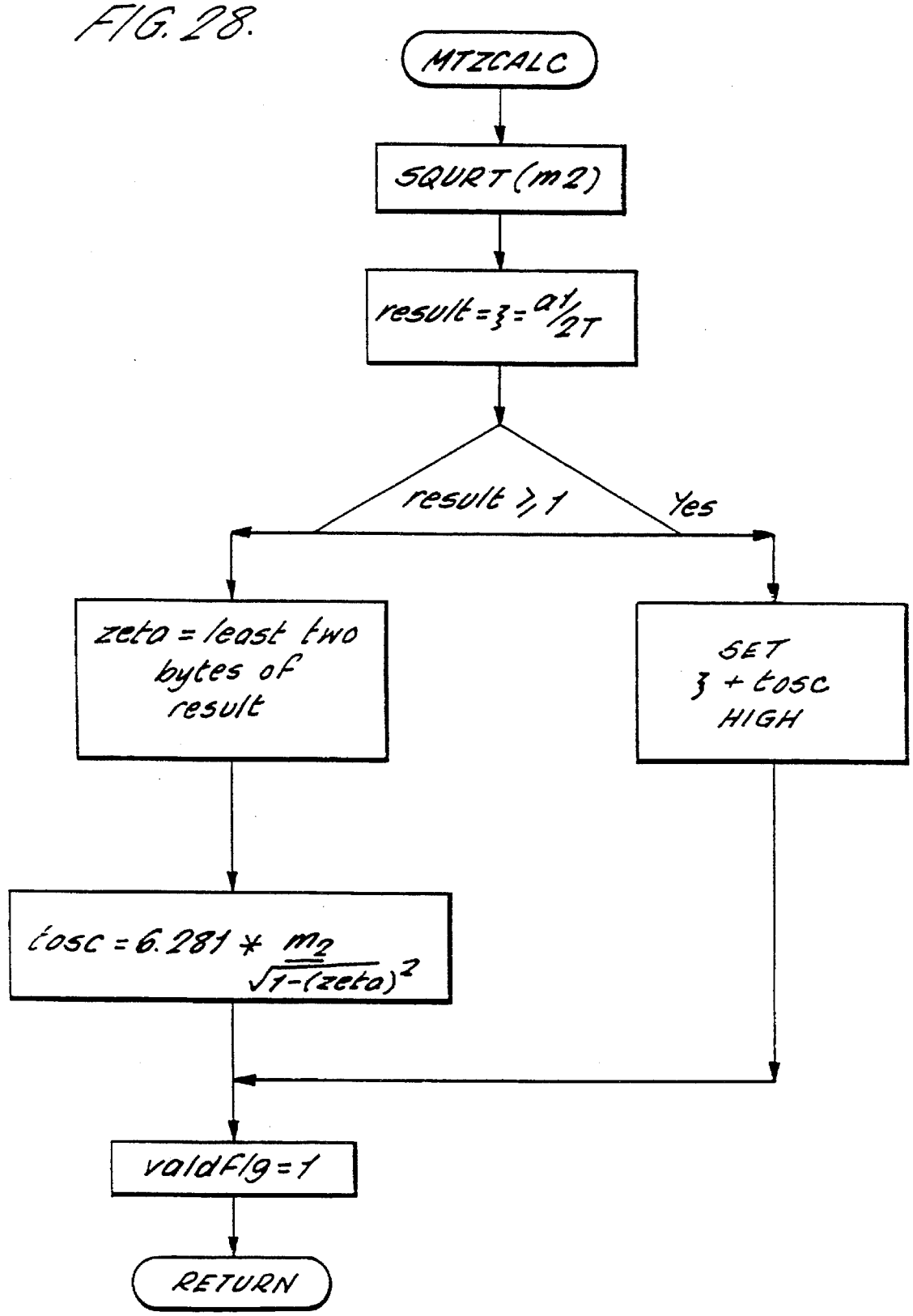
FIG. 28 s a flow diagram of the mtzcalc procedure.

FIG. 28 illustrates the steps undertaken in the MTZCALC procedure. First of all the square root of M2 is taken to obtain a value for T. Csi is then found by dividing $a_1$ by 2×T. If csi is greater than 1 then the value for csi and $t_{osc}$ are set to a maximum. If csi is less than 1 then this is stored as zeta and used to calculate $t_{osc}$. When the calculation is complete the valid data flag is set.

Figure 29:
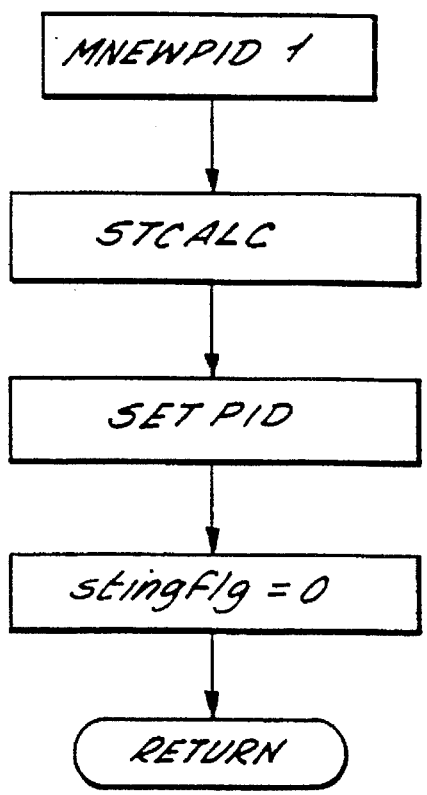
FIG. 29 is a flow diagram of the mnewpid procedure.

FIG. 29 illustrates the steps undertaken by the MNEW-PID 1 procedure. In this procedure the value for csi is compared with the desired value and if this is different new PID coefficients are calculated. The set PID procedure then resets the PID coefficients of the PID controller and the self-tuning flag stingflg is then reset.

Figure 30:
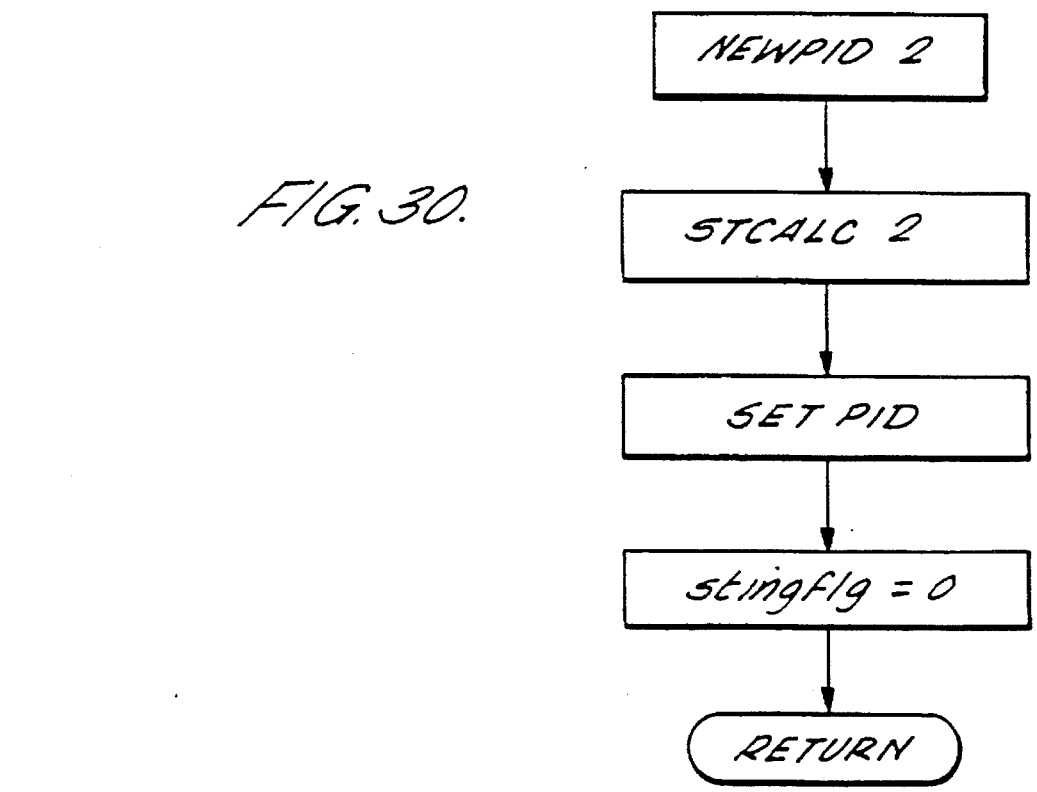
FIG. 30 is a flow diagram of the newpid 2 procedure.

FIG. 30 illustrates the steps undertaken by the new PID 2 procedure. The value for zeta calculated is compared with the desired value and if this differs then new PID coefficients are calculated. The SETPID procedure then sets the PID coefficients of the PID controller and the self-tuning flag stingflg is then reset.

The calculation of the PID coefficients is done using a known technique such as the Zeigler-Nichols technique.

While the present invention has been described with reference to the preferred embodiment, it will be apparent that improvements and modifications may be made within the purview of the invention by those of ordinary skill in the art. For example, the method of moments based technique can be extended to non-zero initial starting conditions for a transient brought about by a change in set point or load. Further, although in the preferred embodiment a second order system has been considered, the present invention is applicable to higher order systems. In addition, the present invention is applicable to both of the second order transfer functions considered in the explanation of the theory behind the present invention. In the specific embodiment only the second of these transfer functions was considered which represents a system which experiences a load change and thus the moments are normalised with respect to the zero order moment. For a system having a transfer function of the first type, which is a system which undergoes a set point change, the error signal does not return to zero and hence the moments are normalised with respect to the new steady state signal level $\epsilon(\infty)$.

We claim:

1. Process control apparatus for use in a control system, wherein said control apparatus comprises:

controller means for coupling to a process in a closed loop of said control system and for controlling a process variable having a predetermined set point value and a measured value;

first comparator means for comparing said predetermined set point value and measured value to generate a deviation signal;

said controller means being responsive to said deviation signal to control at least one operating parameter of said process to reduce said deviation signal;

identification means responsive to said deviation signal to provide a measured value of at least one characteristic of the closed loop response of the control system from said deviation signal by integrating said deviation signal with time;

second comparator means coupled to said identification means and operative to compare said at least one measured characteristic value with at least one predetermined desired characteristic value representing a desired closed loop response of the control system; and adjustment means responsive to said second comparator means when the difference between the measured and desired characteristic values is greater than a predetermined amount, to adjust the response of said controller means such that the closed loop response of the control systems moves towards a desired closed loop response, wherein said identification means includes integration means to integrate said deviation signal until the deviation signal reaches a substantially steady state level comprising a noise band about a deviation signal level of zero.

2. Process control apparatus as claimed in claim 1 wherein said identification means includes integration means to start integrating the deviation signal at a predetermined level.

3. Process control apparatus as claimed in claim 1 wherein said identification means includes integration means to start integrating the deviation signal when the deviation signal level changes from substantially zero to a predetermined level.

4. Process control apparatus as claimed in claim 1 wherein said identification means is operative to provide at least one measured characteristic value by calculating a plurality of weighted integrals of the deviation signal.

5. Process control apparatus as claimed in claim 1 wherein said identification means is operative to determine parameters of a second order model of the transfer function of the closed loop control system.

6. Process control apparatus as claimed in claim 1 wherein said identification means is operative to provide said at least one measured characteristic by calculating a plurality of $j^{th}$ order moments, where a $j^{th}$ order moment is an integral of the deviation signal weighted by minus time to the power j, divided by j factorial, where j is an integer.

7. Process control apparatus as claimed in claim 6 wherein said identification means is operative to only calculate said plurality of moments if said deviation signal exceeds a predetermined band about a steady state level.

8. Process control apparatus as claimed in claim 6 wherein said identification means is operative to normalise the moments with respect to a measure of a phenomenum causing the deviation signal.

9. Process control apparatus as claimed in claim 8 wherein the cause of the deviation signal is a change in the set point value and said identification means is operative to normalise the moments with respect to the set point value.

10. Process control apparatus as claimed in claim 8 wherein the cause of the deviation signal is a change in the set point value and said identification means is operative to normalise the moments with respect to a new steady state level.

11. Process control apparatus as claimed in claim 8 wherein the cause of the deviation signal is a change in operation of the process and said identification means is operative to normalise the moments with respect to the zero order moment.

12. Process control apparatus as claimed in claim 8 wherein for an $n^{th}$ order control system said identification means is operative to calculate at least n moments to provide measured characteristics of the control system to identify the control system.

13. Process control apparatus as claimed in claim 6 wherein said identification means is operative to provide measured values of a damping factor and an oscillation period.

14. Process control apparatus as claimed in claim 6 wherein said identification means is operative to calculate up to the second order moment, where it is assumed that said control system exhibits second order behaviour.

15. Process control apparatus as claimed in claim 1 wherein said identification means provides said at least one measured characteristic by multiplying said deviation signal by a weighting function which provides a weighted deviation signal, and calculates a plurality of $j^{th}$ order weighted moments, where a $j^{th}$ order weighted moment is an integral of the weighted deviation signal weighted by minus time to the power j, divided by j factorial.

16. Process control apparatus as claimed in claim 15 wherein said identification means is operative to multiply said deviation signal by a time weighted function such that the weighted deviation signal approaches a predetermined substantially steady state level more quickly.

17. Process control apparatus as claimed in claim 15 wherein said identification means is operative to calculate said plurality of $j^{th}$ order weighted moments by multiplying said deviation signal by a function $e^{-\alpha t}$, where $\alpha$ is a predetermined damping coefficient and t is time.

18. Process control apparatus as claimed in claim 15 wherein said identification means is operative to calculate the zero order unweighted moment and the zero and first order weighted moments, where it is assumed that said control system exhibits second order behaviour.

19. Process control apparatus as claimed in claim 1 wherein said controller means comprises a proportional integral derivative controller means.

20. Process control apparatus as claimed in claim 19 wherein said identification means is operative to calculate the parameters of the transfer function of a second order model of the control system from the integral of said deviation signal, and to further calculate a damping factor and an oscillation period from said parameters.

21. Process control apparatus as claimed in claim 1 including filter means to filter the deviation signal input to said identification means, said filter means being adapted to remove noise from said deviation signal.

22. Process control apparatus for use in a control system, wherein said control apparatus comprises:

controller means for coupling to a process in a closed loop of said control system and for controlling a process variable having a predetermined set point value and a measured value;

first comparator means for comparing said predetermined set point value and measured value to generate a deviation signal;

said controller means being responsive to said deviation signal to control at least one operating parameter of said process to reduce said deviation signal;

identification means responsive to said deviation signal to provide a measured value of at least one characteristic of the closed loop response of the control system from said deviation signal by integrating said deviation signal with time;

second comparator means coupled to said identification means and operative to compare said at least one measured characteristic value with at least one predetermined desired characteristic value representing a desired closed loop response of the control system; and adjustment means responsive to said second comparator means when the difference between the measured and desired characteristic values is greater than a predetermined amount, to adjust the response of said controller means such that the closed loop response of the control systems moves towards a desired closed loop response;

wherein said identification means includes a quick identification means operative for a deviation signal having positive and negative values with time, to determine the ratio of the integrals of the first positive and negative excursions of the deviation signal to provide an estimate of a characteristic value.

23. Process control apparatus as claimed in claim 22 wherein said quick identification means is only operative if the periods of time for which said deviation signal is positive and negative to produce said excursions are substantially equal.

24. Process control apparatus as claimed in claim 22 wherein said quick identification means is operative to provide an estimate of a damping factor.

25. Process control apparatus as claimed in claim 22 for use with control systems having third and higher order behaviour resulting in asymmetric oscillation of the deviation signal about the steady state level, wherein said quick identification means is operative to compensate for said third and higher order behaviour by measuring and utilising the times at which the deviation signal crosses the steady state level.

26. Process control apparatus as claimed in claim 25 wherein said quick identification means is operative to calculate a damping factor z using the equation $$\frac{1}{z} = \frac{2}{\lambda(\lambda+1)} \cdot \frac{|A_2|}{|A_1|} + \frac{1-\lambda}{1+\lambda}$$

where $\lambda$ is the ratio of the periods of a first and a second excursion in the deviation signal, and $|A_1|$ and $|A_2|$ are the integrals of the first and second excursion respectively.

27. A method of controlling a variable of a process coupled to a controller means in a closed loop control system; comprising the steps of providing a predetermined set point value for a process variable, measuring said process variable to provide a measured value; comparing said predetermined set point value and a measured value to generate a deviation signal; controlling at least one operating parameter of said process in response to said deviation signal; calculating a measured value of at least one characteristic of the closed loop response of the control system from said deviation signal by integrating said deviation signal with time; comparing said at least one measured characteristic value with at least one predetermined desired characteristic value representing a desired closed loop response of the control system; and, when the difference between said measured and characteristic values is greater than a predetermined amount, adjusting the response of said controller means such that the closed loop response of the control system moves towards said desired closed loop response, wherein said deviation signal is integrated until the deviation signal reaches a substantially steady state level comprising a noise band about a deviation signal level of zero.

28. A method as claimed in claim 27 wherein the integration of said deviation signal is started at a predetermined level.

29. A method as claimed in claim 27 wherein the integration of said deviation signal is started when the deviation signal level changes from substantially zero to a predetermined level.

30. A method as claimed in claim 27 wherein said at least one measured characteristic value is calculated by calculating a plurality of weighted integrals of the deviation signal.

31. A method as claimed in claim 27 wherein said at least one measured characteristic value includes parameters of a second order model of the transfer function of the closed loop control system.

32. A method as claimed in claim 27 wherein said at least one characterised value is calculated by calculating a plurality of $j^{th}$ order moments, where a $j^{th}$ order moment is an integral of the deviation signal weighted by minus time to the power j, divided by j factorial, where j is an integer.

33. A method as claimed in claim 32 wherein said plurality of moments are only calculated if said deviation signal exceeds a predetermined band about a steady state level.

34. A method as claimed in claim 33 wherein said at least one characteristic value includes a damping factor and the oscillation period of said deviation signal.

35. A method as claimed in of claim 33 wherein up to the second order moment is calculated, where it is assumed that said control system exhibits second order behaviour.

36. A method as claimed in claim 33 wherein said controller means is a proportional integral derivative controller means.

37. A method as claimed in claim 36 including the steps of calculating parameters of a second order model of the transfer function of the control system from the integral of said deviation signal, and calculating a damping factor and an oscillation period from said parameters.

38. A method as claimed in claim 33 including the step of filtering the noise from the derivation signal before calculating said at least one characteristic value.

39. A method as claimed in claim 33 wherein for an $n^{th}$ order control system said method includes the step of calculating at least n moments to provide said measured characteristics to identify the control system.

40. A method as claimed in claim 32 wherein said moments are normalised with respect to a measure of a phenomenum causing the deviation signal.

41. A method as claimed in claim 40 wherein the cause of the deviation signal is a change in the set point value, and the moments are normalised with respect to the set point value.

42. A method as claimed in claim 40 wherein the cause of the deviation signal is a change in the set point value, and the moments are normalised with respect to a new steady state level.

43. A method as claimed in claim 40 wherein the cause of the deviation signal is a change in operation of the process, and the moments are normalised with respect to the zero order moment.

44. A method as claimed in claim 27 wherein said at least one measured characteristic value is calculated by multiplying said deviation signal by a weighting function, and calculating a plurality of $j^{th}$ order weighted moments, where a $j^{th}$ order weighted moment is an integral of the weighted deviation signal weighted by minus time to the power j, divided by j factorial.

45. A method as claimed in claim 44 wherein said weighting function is a function of time and the weighted deviation signal approaches a predetermined steady state level more quickly.

46. A method as claimed in claim 44 wherein said weighting function is $e^{-\alpha t}$, where $\alpha$ is a predetermined damping coefficient and t is time.

47. A method as claimed in claim 44 wherein said at least one characteristic value is calculated by calculating the zero order unweighted moment and the zero and first order weighted moments, where it is assumed that said control system exhibits second order behaviour.

48. A method of controlling a variable of a process coupled to a controller means in a closed loop control system; comprising the steps of providing a predetermined set point value for a process variable, measuring said process variable to provide a measured value; comparing said predetermined set point and measured values to generate a deviation signal; controlling at least one operating parameter of said process in response to said deviation signal; calculating a measured value of at least one characteristic of the closed loop response of the control system from said deviation signal by integrating said deviation signal with time; comparing said at least one measured characteristic value with at least one predetermined desired characteristic value representing a desired closed loop response of the control system; and, when the difference between said measured and characteristic values is greater than a predetermined amount, adjusting the response of said controller means such that the closed loop response of the control system moves towards said desired closed loop response; including the step of determining the ratio of the integrals of a first positive and negative excursion of the deviation signal to provide an estimate of a said characteristic value.

49. A method as claimed in claim 48 wherein the step of determining the ratio of the integrals of the first positive and negative peaks is only undertaken if the periods of time for which said deviation signal is positive and negative to produce said excursions are substantially equal.

50. A method as claimed in claim 48 wherein an estimate of a damping factor is provided by determining the ratio of the excursions.

51. A method as discussed in claim 48 for use when said control system has third and higher order behaviour resulting in asymmetric oscillation of the deviation signal about the steady state level, including the step of measuring the times at which the deviation signal crosses the steady state level and compensating for said third and higher order behaviour utilising said measured times.

52. A method as claimed in claim 51 wherein said measured times are utilised to calculate the damping factor z using the equation $$\frac{1}{z} = \frac{2}{\lambda(\lambda+1)} \cdot \frac{|A_2|}{|A_1|} + \frac{1-\lambda}{1+\lambda}$$

where $\lambda$ is the ratio of the periods of a first and a second excursion in the deviation signal, and $|A_1|$ and $|A_2|$ are integrals of the first and second peaks respectively.

53. In a self-tuning controller apparatus coupled to process in a control system for controlling a process variable having a predetermined set point value and a measured value, said controller apparatus including a controller responsive to the difference between said set point and measured values to control at least one operating parameter of the process, and adaptor means operative to determine characteristics of said control system and adjust the response of said controller in response to a difference between said determined characteristics and predetermined desired characteristics, the improvement in the controller apparatus comprising weighting means operative to multiply the difference between the set point and measured values by a plurality of weighting function to provide a weighted difference, integrator means to integrate the weighted difference with time to provide a plurality of weighted integrals, and identification means operative to use said weighted integrals to determine said characteristics of the control system, wherein said weighting means is operative to multiply the weighted difference by a plurality of time weighted functions.

54. The controller apparatus as claimed in claim 53 wherein said weighting means is operative to multiply the difference by minus time to the power j, divided by j factorial, and said integrating means is operative to provide a plurality j of $j^{th}$ order moments, where a $j^{th}$ order moment is an integral of the difference weighted by minus time to the power j, divided by j factorial, where j is an integer.

55. The controller as claimed in claim 54 wherein for a control system exhibiting $n^{th}$ order behaviour, said integrating means is operative to provide at least the $n^{th}$ order moments, where n is an integer.

* * * * *